US010720970B2

(12) United States Patent
Lomayev et al.

(10) Patent No.: US 10,720,970 B2
(45) Date of Patent: Jul. 21, 2020

(54) APPARATUS, SYSTEM AND METHOD OF COMMUNICATING A SINGLE CARRIER (SC) TRANSMISSION

(71) Applicant: INTEL CORPORATION, Santa Clara, CA (US)

(72) Inventors: Artyom Lomayev, Nizhny Novgorod (RU); Alexander Maltsev, Nizhny Novgorod (RU); Carlos Cordeiro, Portland, OR (US); Michael Genossar, Modiin (IL)

(73) Assignee: INTEL CORPORATION, Santa Clara, CA (US)

( * ) Notice: Subject to any disclaimer, the term of this patent is extended or adjusted under 35 U.S.C. 154(b) by 85 days.

(21) Appl. No.: 16/125,711

(22) Filed: Sep. 9, 2018

(65) Prior Publication Data

US 2019/0140707 A1    May 9, 2019

Related U.S. Application Data

(63) Continuation of application No. 15/084,849, filed on Mar. 30, 2016, now Pat. No. 10,103,792.
(Continued)

(51) Int. Cl.
*H04B 7/0413* (2017.01)
*H04B 7/06* (2006.01)
*H04L 27/26* (2006.01)

(52) U.S. Cl.
CPC ......... *H04B 7/0413* (2013.01); *H04B 7/0669* (2013.01); *H04L 27/2605* (2013.01); *H04L 27/2636* (2013.01)

(58) Field of Classification Search
CPC . H04B 7/0413; H04B 7/0669; H04L 27/2605; H04L 27/2636
See application file for complete search history.

(56) References Cited

U.S. PATENT DOCUMENTS

| 7,095,731 B2 | 8/2006 | Kim et al. |
| 7,684,445 B2 | 3/2010 | Wang |

(Continued)

FOREIGN PATENT DOCUMENTS

| EP | 2573992 | 3/2013 |
| EP | 3403338 | 11/2018 |

(Continued)

OTHER PUBLICATIONS

European Search Report for European Patent Application No. 16885417.2, dated Oct. 24, 2019, 11 pages.
(Continued)

*Primary Examiner* — Ivan O Latorre
(74) *Attorney, Agent, or Firm* — Shichrur & Co.

(57) ABSTRACT

For example, a wireless station may be configured to generate a plurality of time-domain streams in a time domain, the plurality of time-domain streams comprising at least a first time-domain stream comprising a first data sequence in a first interval and a second time-domain stream comprising a second data sequence in the first interval, the first time-domain stream comprises a time-inverted and sign-inverted complex conjugate of the second data sequence in a second interval subsequent to the first interval, and the second time-domain stream comprises a time-inverted complex conjugate of the first data sequence in the second interval; to convert the plurality of time-domain streams into a respective plurality of frequency-domain streams in a frequency domain; and to transmit a Multiple-Input-Multiple-Output (MIMO) transmission based on the plurality of frequency-domain streams.

22 Claims, 9 Drawing Sheets

Related U.S. Application Data

(60) Provisional application No. 62/278,593, filed on Jan. 14, 2016.

(56) References Cited

U.S. PATENT DOCUMENTS

| | | | |
|---|---|---|---|
| 7,848,436 | B2 | 12/2010 | Chun et al. |
| 8,040,968 | B2 | 10/2011 | Sandhu |
| 10,027,442 | B2 | 7/2018 | Kravtsov et al. |
| 10,103,792 | B2 | 10/2018 | Lomayev et al. |
| 10,397,033 | B2 * | 8/2019 | Zhang ............... H04L 27/265 |
| 2003/0220104 | A1 | 11/2003 | Magee et al. |
| 2004/0047284 | A1 | 3/2004 | Edison |
| 2005/0074080 | A1 | 4/2005 | Catreux et al. |
| 2005/0141414 | A1 | 6/2005 | Cheun et al. |
| 2005/0254596 | A1 | 11/2005 | Naguib |
| 2006/0245472 | A1 | 11/2006 | Pan et al. |
| 2007/0110174 | A1 | 5/2007 | Glazko et al. |
| 2007/0242789 | A1 | 10/2007 | Jechoux et al. |
| 2008/0013442 | A1 | 1/2008 | Fechtel |
| 2008/0080613 | A1 | 4/2008 | Garth et al. |
| 2008/0101490 | A1 | 5/2008 | Kawauchi et al. |
| 2008/0279301 | A1 | 11/2008 | Khan et al. |
| 2009/0028258 | A1 | 1/2009 | Ma et al. |
| 2009/0041151 | A1 | 2/2009 | Khan et al. |
| 2010/0091903 | A1 | 4/2010 | Castelain et al. |
| 2010/0091904 | A1 | 4/2010 | Wang et al. |
| 2010/0119017 | A1 | 5/2010 | Kim |
| 2010/0226415 | A1 | 9/2010 | Mehta et al. |
| 2011/0044313 | A1 * | 2/2011 | Jeong ............... H04L 5/0023 370/344 |
| 2011/0159831 | A1 | 6/2011 | Jiang |
| 2011/0207399 | A1 | 8/2011 | Thiagarajan et al. |
| 2011/0305286 | A1 | 12/2011 | Shimezawa et al. |
| 2012/0195391 | A1 * | 8/2012 | Zhang ............... H04L 5/0048 375/295 |
| 2013/0136216 | A1 | 5/2013 | Shirakata et al. |
| 2013/0286959 | A1 * | 10/2013 | Lou ............... H04W 72/04 370/329 |
| 2014/0093020 | A1 | 4/2014 | Monzen et al. |
| 2014/0126620 | A1 | 5/2014 | Maltsev et al. |
| 2015/0071372 | A1 | 3/2015 | Zhang |
| 2015/0311962 | A1 | 10/2015 | Maltsev et al. |
| 2015/0365908 | A1 | 12/2015 | Maltsev et al. |
| 2016/0105261 | A1 | 4/2016 | Suh et al. |
| 2016/0241314 | A1 | 8/2016 | Ferrante et al. |
| 2016/0330059 | A1 * | 11/2016 | Eitan ............... H03M 13/1505 |
| 2016/0330738 | A1 | 11/2016 | Eitan |
| 2017/0048095 | A1 | 2/2017 | Sun et al. |
| 2017/0134126 | A1 | 5/2017 | Sanderovich et al. |
| 2017/0207830 | A1 | 7/2017 | Lomayev et al. |
| 2017/0215039 | A1 | 7/2017 | Amizur et al. |
| 2018/0026750 | A1 | 1/2018 | Kravtsov et al. |
| 2019/0052395 | A1 | 2/2019 | Motozuka et al. |
| 2019/0207713 | A1 | 7/2019 | Lomayev et al. |

FOREIGN PATENT DOCUMENTS

| | | | | |
|---|---|---|---|---|
| WO | WO-2015198140 | A1 * | 12/2015 | ......... H04L 27/0008 |
| WO | WO-2017044420 | A1 * | 3/2017 | ........... H04B 7/0626 |
| WO | 2017123373 | | 7/2017 | |
| WO | 2018017234 | | 1/2018 | |

OTHER PUBLICATIONS

International Preliminary Report on Patentability for International Application No. PCT/US2017/038257, dated Jan. 31, 2019, 12 pages.

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Rupali Hulwan et al., "Single Carrier Frequency Domain Equalizer with Alamouti Signalling Using Zero Forcing Equalizer for MIMO System.", International Journal of Engineering Development and Research (www.ijedr.org), © 2015 IJEDR | vol. 3, Issue 1 | ISSN: 2321-9939, Department of Electronics & Telecommunication Engineering, NKOCET, Solapur, India, 6 pages.

International Search Report and Written Opinion for PCT/US2016/066612, dated Apr. 5, 2017, 13 pages.

Office Action for U.S. Appl. No. 15/084,849, dated Dec. 29, 2017, 35 pages.

Notice of Allowance for U.S. Appl. No. 15/084,849, dated Jun. 11, 2018, 11 Pages.

International Preliminary Report on Patentability for International Application No. PCT/US2016/066612, dated Jul. 26, 2018, 10 pages.

International Search Report and the Written Opinion for International Application No. PCT/US2017/039921, dated Oct. 30, 2017, 15 pages.

Siavash M. Alamouti, "A Simple Transmit Diversity Technique for Wireless Communications", IEEE Journal on Select Areas in Communications, vol. 16, No. 8, Oct. 1998, pp. 1451-1458, 8 pages.

Office Action for U.S. Appl. No. 15/394,864, dated Sep. 14, 2017, 16 pages.

International Search Report and the Written Opinion for International Application No. PCT/US2017/038257, dated Sep. 21, 2017, 16 pages.

Notice of Allowance for U.S. Appl. No. 15/394,864, dated Mar. 16, 2018, 12 Pages.

International Preliminary Report on Patentability for International Application No. PCT/US2017/039921, dated Jan. 31, 2019, 11 pages.

Office Action for U.S. Appl. No. 16/311,904, dated Sep. 18, 2019, 32 pages.

European Search Report for European Patent Application No. 17831542.0, dated Feb. 17, 2020, 9 pages.

"Wireless LAN at 60 GHz-IEEE 802.11 ad Explained Application Note", XP055259363, May 30, 2013, Retrieved from the Internet: URL:http://cp.literature.agilentcom/litweb/pdf/5990-9697EN.pdf [retrieved on Mar. 17, 2016], 28 pages.

Office Action for U.S. Appl. No. 16/311,904, dated Feb. 27, 2020, 19 pages.

* cited by examiner

APPARATUS, SYSTEM AND METHOD OF COMMUNICATING A SINGLE CARRIER (SC) TRANSMISSION

CROSS REFERENCE

This Application claims the benefit of and priority from U.S. Provisional Patent Application No. 62/278,593 entitled "Apparatus, System and Method of communicating according to a transmit diversity scheme", filed Jan. 14, 2016, the entire disclosure of which is incorporated herein by reference.

TECHNICAL FIELD

Embodiments described herein generally relate to communicating a Multiple-Input-Multiple-Output (MIMO) transmission.

BACKGROUND

A wireless communication network in a millimeter-wave (mmWave) band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
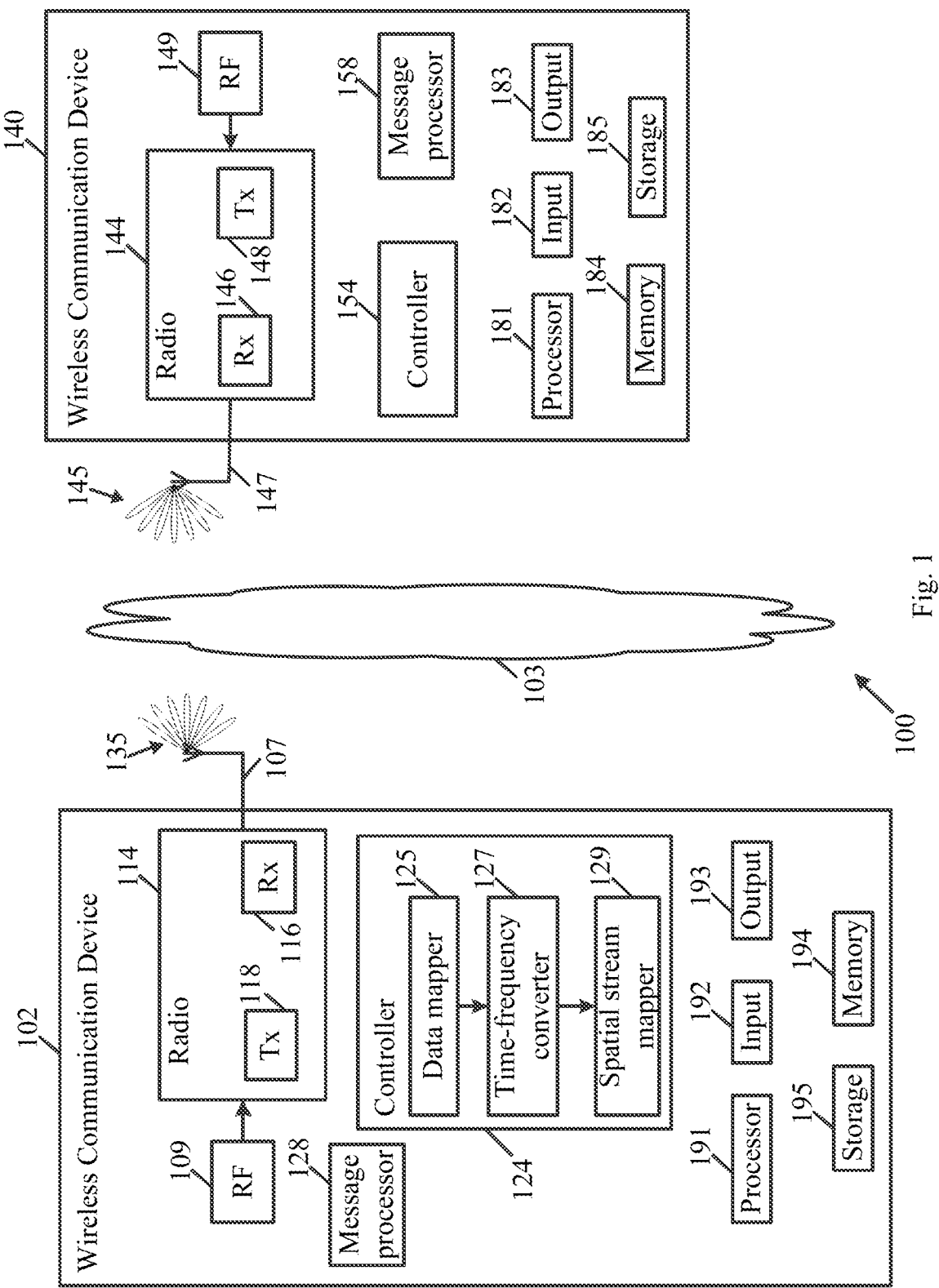
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012, IEEE Standard for Information technology-Telecommunications and information exchange between systems Local and metropolitan area networks-Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology-Telecommunications and Information Exchange Between Systems-Local and Metropolitan Area Networks-Specific Requirements-Part 11: Wireless LAN Medium Access Control (MAC) and Physical Layer (PHY) Specifications-Amendment 4: Enhancements for Very High Throughput for Operation in Bands below 6 GHz", December, 2013); IEEE 802.11ad ("IEEE P802.11ad-2012, IEEE Standard for Information Technology Telecommunications and Information Exchange Between Systems-Local and Metropolitan Area Networks-Specific Requirements-Part 11: Wireless LAN Medium Access Control (MAC) and Physical Layer (PHY) Specifications Amendment 3: Enhancements for Very High Throughput in the 60 GHz Band", 28 December, 2012); IEEE-802.11REVmc ("IEEE 802.11-REVmc™/D3.0, June 2014 draft standard for Information technology-Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology-Telecommunications and Information Exchange Between Systems Local and Metropolitan Area Networks-Specific Requirements Part 11: Wireless LAN Medium Access Control (MAC) and Physical Layer (PHY) Specifications-Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "millimeter-wave (mmWave) STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Some demonstrative embodiments may be implemented by a DMG STA (also referred to as a "millimeter-wave (mmWave) STA (mSTA)"), which may include, for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, wireless communication devices 102 and/or 140 may include a mobile device or a non-mobile, e.g., a static, device.

For example, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel in a directional frequency band. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other additional or alternative types of channels over any other, directional and/or non-directional, frequency bands.

In some demonstrative embodiments, devices 102 and/or 140 may operate as, and/or perform the functionality of, one or more wireless stations (STA), e.g., as described below.

In some demonstrative embodiments, devices 102 and/or 140 may operate as, and/or perform the functionality of, one or more DMG stations, or one or more Extended DMG (EDMG) stations.

In other embodiments, devices 102 and/or 140 may operate as, and/or perform the functionality of, any other wireless device and/or station, e.g., a WLAN STA, a WiFi STA, and the like.

In some demonstrative embodiments, devices 102 and/or 140 may be configured to operate as, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured to operate as, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radio 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, radios 114 and/or 144 may include, or may be associated with, a plurality of directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number of rows, and an integer number of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, device 140 may include one or more, e.g., a plurality of, RF chains 149 connected to, and/or associated with, antennas 147.

In some demonstrative embodiments devices 102 and/or 140 may be configured to communicate over a Next Generation 60 GHz (NG60) network, an Extended DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band. For example, devices 102 and/or 140 may operate as, and/or perform the functionality of, one or more EDMG stations and/or NG60 stations.

Some demonstrative embodiments may be implemented, for example, as part of a new and/or modified standard in an mmWave band, e.g., a 60 GHz frequency band or any other directional band, for example, as an evolution of an IEEE 802.11ad standard.

In some demonstrative embodiments, devices 102 and/or 140 may be configured according to one or more standards, for example, in accordance with an IEEE 802.11ay Standard, which may be, for example, configured to enhance the efficiency and/or performance of an IEEE 802.11ad Specification, which may be configured to provide WiFi connectivity in a 60 GHz band.

Some demonstrative embodiments may enable, for example, to significantly increase the data transmission rates defined in the IEEE 802.11ad specification, for example, from 7 Gbps, e.g., up to 30 Gbps, or to any other data rate, which may, for example, satisfy growing demand in network capacity for new coming applications.

Some demonstrative embodiments may be implemented, for example, to allow increasing a transmission data rate, for example, by applying Multiple Input Multiple Output (MIMO) and/or channel bonding techniques.

In some demonstrative embodiments, the IEEE 802.11ad-2012 Specification may be configured to support a Single User (SU) system, in which a Station (STA) may transmit frames to a single STA at a time.

Some demonstrative embodiments may enable, for example, communication in one or more use cases, which may include, for example, a wide variety of indoor and/or outdoor applications, including but not limited to, for example, at least, high speed wireless docking, ultra-short range communications, 8K Ultra High Definition (UHD) wireless transfer at smart home, augmented reality headsets and high-end wearables, data center inter-rack connectivity, mass-data distribution or video on demand system, mobile offloading and multi-band operation, mobile front-hauling, and/or wireless backhaul.

In some demonstrative embodiments, a communication scheme may include Physical layer (PHY) and/or Media Access Control (MAC) layer schemes, e.g., implemented by one or more of the elements of devices 102 and/or 140, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, Single User (SU) techniques, and/or Multi User (MU) MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, devices 102 and/or 140 may be configured to communicate MIMO communications over the mmWave wireless communication band.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

In some demonstrative embodiments, devices 102 and/or 140 may be configured to implement one or more techniques, which may, for example, enable to support communications over a MIMO communication channel, e.g., a SU-MIMO channel between two mmWave STAs, or a MU-MIMO channel between a STA and a plurality of STAs.

In some demonstrative embodiments, devices 102 and/or 140 may be configured to communicate according to a diversity scheme for MIMO transmission, e.g., as described below.

In some demonstrative embodiments, the diversity scheme may be configured, for example, based on a space-time diversity scheme, e.g., as described below.

In some demonstrative embodiments, the diversity scheme may be configured, for example, based on an Alamouti technique, for example, as described by Siavash M Alamouti, "A Simple Transmit Diversity Technique for Wireless Communications," IEEE Journal on Selected Areas in Communications, vol. 16, no. 8, October 1998. In one example, the diversity scheme may support, for example, transmission from 2 Transmit (TX) antennas to $N_R$ Receive (RX) antennas, for example, for communication according to a $2 \times N_R$ MIMO scheme.

In other embodiments, the diversity scheme may be configured, for example, based on any other space-time diversity scheme, for example, a Space Time Block Code (STBC) scheme, and/or any other diversity scheme.

In some demonstrative embodiments, devices 102 and/or 140 may be configured to communicate transmissions according to a frame structure, which may be configured for Single Carrier (SC) PHY modulation with Frequency Domain Equalization (FDE), for example, to support a MIMO diversity scheme, e.g., based on the Alamouti technique. In other embodiments, the MIMO diversity scheme may support any other additional or alternative diversity technique.

In some demonstrative embodiments, a frame structure in a time domain may be configured, for example, to allow creating a mapping of spatial subcarriers in a frequency domain, which may be, for example, suitable for application of the space-time diversity scheme, e.g., according to an Alamouti transmit diversity technique.

In some demonstrative embodiments, the frame structure may be configured, for example, according to a first approach, which may be based on a Guard Interval (GI), e.g., as described below. This approach may allow, for example, using known GIs in PHY layer estimations. This approach may, in some cases, introduce additional overhead.

In some demonstrative embodiments, the frame structure may be configured, for example, according to a second approach, which may be based on a Cyclic Prefix (CP) extension, e.g., as described below. This approach may allow, for example, to reduce overhead, e.g., without using known GI in the PHY layer estimations.

In other embodiments, the frame structure may be configured with respect to any other additional or alternative mechanisms and/or techniques, e.g., in addition to or instead of the GIs and/or the CP extensions.

In some demonstrative embodiments, a first device ("transmitter device" or "transmitter side"), e.g., device 102, may be configured to generate and transmit a MIMO transmission based on a plurality of spatial streams, for example, in accordance with a space-time diversity scheme, e.g., as described below.

In some demonstrative embodiments, a second device ("receiver device" or "receiver side"), e.g., device 140, may be configured to receive and process the MIMO transmission based on the plurality of spatial streams, for example, in accordance with the space-time diversity scheme, e.g., as described below.

In some demonstrative embodiments, one or more aspects of the transmit diversity scheme described herein may be implemented, for example, to provide at least a technical solution to allow a simple combining scheme at the receiver device, for example, to mitigate and/or cancel out interference, e.g., Inter Stream Interference (ISI), to combine channel diversity gain, which may provide reliable data transmission, e.g., even in hostile channel conditions, and/or to provide one or more additional and/or alternative advantages and/or technical solutions.

For example, in some embodiments, the receiver side may not be required to use a MIMO equalizer, for example, while being able to use at least only Single Input Single Output (SISO) equalizers, e.g., in each stream of the plurality of spatial streams. According to this example, the diversity MIMO scheme may be simple for implementation.

In some demonstrative embodiments, a PHY and/or Media Access Control (MAC) layer for a system operating in the 60 GHz band, e.g., the system of FIG. 1, may be defined, for example, in accordance with an IEEE 802.11ad Standard, a future IEEE 802.11ay Standard, and/or any other Standard.

In some demonstrative embodiments, some implementations may be configured to communicate a MIMO transmission over a directional channel, for example, using beamforming with a quite narrow beamwidth and fast enough signal transmission with typical frame duration, e.g., of about 100 microseconds (usec). Such implementations may allow, for example, having a static channel per entire packet transmission, and/or may enable the receiver side to perform channel estimation at the very beginning of the packet, e.g., using a Channel Estimation Field (CEF). A phase may be tracked, for example, instead of performing channel tracking using pilots. This may allow, for example, assuming a substantially unchanged or static channel over two or more successive OFDM or SC symbol transmissions.

In some demonstrative embodiments, devices 102 and/or 140 may be configured to communicate a MIMO transmission according to a diversity scheme, which may be based on a space-time diversity scheme, for example, a Space Time Block Code (STBC) scheme, e.g., an Alamouti diversity scheme, or any other space-time diversity scheme, e.g., as described below.

For example, a space-time diversity scheme, e.g., in accordance with the Alamouti diversity scheme, may be configured to transmit a pair of signals, denoted $(S_0, S_1)$, for example, concurrently via two antennas, denoted #0 and #1, at a time moment, denoted t; followed by repetition of the signals with coding, e.g., the signals $(-S_1^*, S_0^*)$, via the antennas #0 and #1, at a subsequent time moment, denoted t+T. The symbol * denotes an operation of complex conjugation. This diversity scheme may create two orthogonal sequences in a space-time domain.

In some demonstrative embodiments, it may be assumed that the channel does not change during consequent vector transmissions, for example, for communications over a narrow beamwidth, e.g., over a directional frequency band, as described above. Accordingly, it may be assumed that the sequential transmissions of the signals $S_0$ and $-S_1^*$ are transmitted through a substantially unchanged or static channel having a substantially unchanged or static channel coefficient $H_0$, and/or that the sequential transmissions of the signals $S_1$ and $S_0^*$ are transmitted through a substantially unchanged or static channel having a substantially unchanged or static channel coefficient $H_1$.

Figure 2:
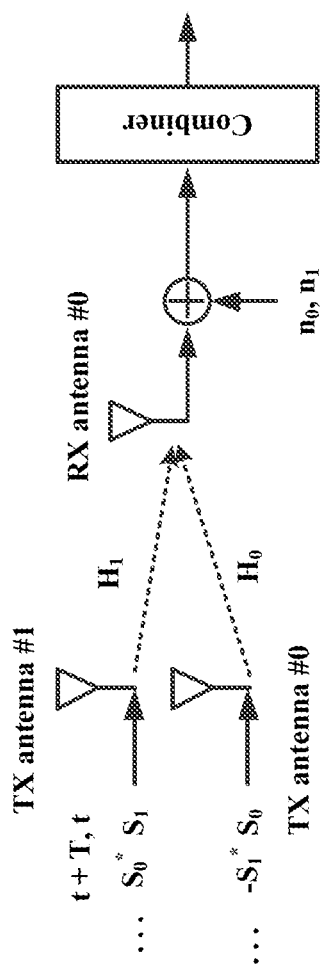
FIG. 2 is a schematic illustration of an Alamouti transmit diversity scheme, which may be implemented, in accordance with some demonstrative embodiments.

FIG. 2 is a schematic illustration of an Alamouti transmit diversity scheme, which may be implemented, in accordance with some demonstrative embodiments. For example, the transmit diversity scheme of FIG. 2 illustrates spatial coding for an Alamouti transmit diversity scheme with a 2×1 configuration.

In some demonstrative embodiments, devices 102 (FIG. 1) and/or 140 (FIG. 1) may be configured to communicate according to a space-time transmit diversity scheme, which may be configured, for example, for 2×1 MIMO communication, e.g., as shown in FIG. 2.

In other embodiments, devices 102 (FIG. 1) and/or 140 (FIG. 1) may be configured to communicate according to a space-time transmit diversity scheme, which may be configured, for example, for any other type of MIMO communication, e.g., any other $M_T \times N_R$ MIMO communication, e.g., wherein $M_T$ is equal or greater than 2, and $N_R$ is equal or greater than 1.

Referring back to FIG. 1, in some demonstrative embodiments, devices 102 and/or 140 may be configured to communicate the MIMO transmission according to a space-time diversity scheme to map a plurality of frequency domain streams to a plurality of consecutive symbols in a plurality of frequency domain spatial streams, e.g., as described below.

In some demonstrative embodiments, the space-time diversity scheme may be configured to map a plurality of frequency domain streams to first and second consecutive symbols in first and second frequency domain spatial streams, e.g., as described below.

Figure 3:
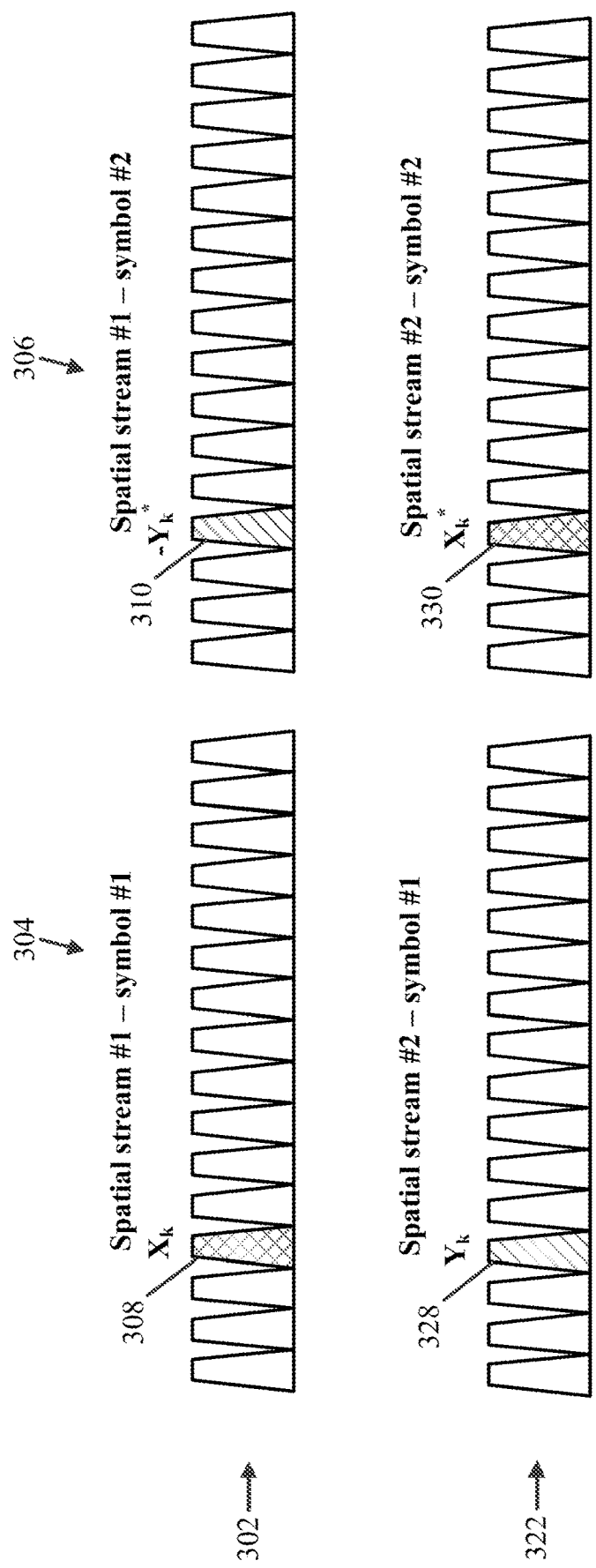
FIG. 3 is a schematic illustration of a mapping of symbols to subcarriers, in accordance with some demonstrative embodiments.

Reference is made to FIG. 3, which schematically illustrates a mapping of symbols to subcarriers, in accordance with some demonstrative embodiments. For example, devices 102 and/or 140 (FIG. 1) may be configured to communicate a MIMO transmission according to the mapping scheme of FIG. 3.

In some demonstrative embodiments, the mapping of symbols to subcarriers shown in FIG. 3 may be configured to support a diversity scheme, for example, according to the Alamouti diversity technique, e.g., according to FIG. 2.

In some demonstrative embodiments, as shown in FIG. 3, a plurality of data symbols may be mapped to a first frequency-domain spatial stream 302 and a first frequency-domain spatial stream 304.

In some demonstrative embodiments, as shown in FIG. 3, a pair of symbols, denoted $(X_k, Y_k)$, may be mapped to a subcarrier with an index k of an OFDM symbol 304, denoted symbol #1, in the spatial streams 302 and 322, denoted stream #1 and stream #2, respectively.

In some demonstrative embodiments, as shown in FIG. 3, a repetition of the pair of symbols $(X_k, Y_k)$ with coding, e.g., a pair of encoded symbols $(-Y_k^*, X_k^*)$, may be mapped to a consequent OFDM symbol 306, denoted symbol #2, for example, to the same subcarrier with the index k in the spatial streams 302 and 322.

For example, as shown in FIG. 3, the first frequency-domain spatial stream 302 may include a first data symbol of a first data sequence, e.g., the data symbol $X_k$, mapped to a subcarrier 308 of the first frequency symbol 304, and the second frequency-domain spatial stream 322 may include a second data symbol of a second data sequence, e.g., the data symbol $Y_k$, mapped to a subcarrier 328, e.g., the same k-th subcarrier 308, of the first frequency symbol 304.

For example, as shown in FIG. 3, the first frequency-domain spatial stream 302 may include a sign-inverted complex conjugate of the second data symbol, e.g., $Y_k^*$, mapped to a subcarrier 310 of the second frequency symbol 306, and the second frequency-domain spatial stream 322 may include a complex conjugate of the first data symbol, e.g., $X_k^*$, mapped to a subcarrier 330, e.g., the same subcarrier 310, of the second frequency symbol 306.

In some demonstrative embodiments, the diversity scheme of FIG. 3 may be applied for an OFDM modulation, for example, in a frequency domain, for example, by repetition mapping to the subcarriers in streams 302 and 322.

In some demonstrative embodiments, it may be assumed that the channel per subcarrier does not change, for example, for a transmission over a directional frequency band, for example, due to the stationary property of the channel in the 60 GHz band. Accordingly, an optimal combining technique, e.g., in accordance with an Alamouti combining technique, may be applied at the receiver side, for example, to create diversity gain and/or cancel out inter stream interference, e.g., as described below.

In some demonstrative embodiments, the Alamouti scheme may be applied to the OFDM PHY transmission, for example, when performing data mapping in the frequency domain. However, in contrast to the OFDM mapping performed in the frequency domain, other types of mapping, for example, a SC PHY mapping of symbols, may be performed in the time domain.

Referring back to FIG. 1, in some demonstrative embodiments a wireless device, e.g., devices 102 and/or 140, may be configured to communicate according to a space-time transmit diversity scheme, which may define a mapping of subcarriers to a plurality of spatial streams, e.g., to two spatial streams or any other number of spatial streams, for example, for SC MIMO.

In some demonstrative embodiments, devices 102 and/or 140 may be configured to communicate a MIMO transmission according to a frame structure, which may be configured for SC PHY modulation, for example, to support a diversity scheme, e.g., the diversity scheme accruing to FIGS. 2 and/or 3, e.g., as described below.

In some demonstrative embodiments, the frame structure may be configured, for example, to include data in a sequence of time intervals of a plurality of time-domain streams, e.g., as described below.

In some demonstrative embodiments, the data may be arranged in the frame structure, for example, such that upon conversion of the time-domain streams into a frequency domain, the data may be mapped in the frequency domain according to a time-space diversity scheme, for example, according to the mapping scheme of FIG. 3.

In some demonstrative embodiments, controller 124 may be configured to cause, trigger, and/or control a wireless station implemented by device 102 to generate and transmit a MIMO transmission to at least one other station, for example, a station implemented by device 140, e.g., as described below.

In some demonstrative embodiments, controller 124 may be configured to cause, trigger, and/or control the wireless station implemented by device 102 to generate and transmit the MIMO transmission according to a SC modulation scheme, e.g., as described below.

In some demonstrative embodiments, controller 124 may be configured to cause, trigger, and/or control the wireless station implemented by device 102 to generate a plurality of spatial streams in a time domain based on data to be transmitted, which may be represented by a plurality of data samples, e.g., as described below.

In some demonstrative embodiments, controller 124 may include, operate as, and/or perform the functionality of a data mapper 125, which may be configured to generate the plurality of time-domain streams in a time domain, for example, based on data samples of the data to be transmitted, e.g., as described below.

In some demonstrative embodiments, data mapper 125 may be configured to map the data samples to the plurality of time-domain streams according to a frame structure, which may be configured to support a time-space diversity scheme, for example, according to FIGS. 2 and/or 3, e.g., as described below.

In some demonstrative embodiments, data mapper 125 may be configured to map the data samples to a plurality of intervals in the plurality of time-domain streams, e.g., as described below.

In some demonstrative embodiments, the plurality of time-domain streams may include at least first and second time-domain streams, e.g., as described below.

In some demonstrative embodiments, the plurality of time-domain streams may include two time-domain streams, for example, to support a $2 \times N_R$ MIMO transmission, e.g., as described below. In other embodiments, the plurality of time-domain streams may include any other number of time-domain streams, for example, $M_T$ time-domain streams to support an $M_T \times N_R$ MIMO transmission.

In some demonstrative embodiments, data mapper 125 may be configured to generate the plurality of time-domain streams, for example, by mapping first and second data sequences to a first interval of the first and second time-domain streams; and by mapping an encoded repetition of the first and second data sequences to a second interval of the first and second time-domain streams, e.g., subsequent to the first interval, as described below.

In some demonstrative embodiments, the first and second data sequences may include data samples corresponding to a pair of data symbols, for example, the pair of data symbols $(X_k, Y_k)$, e.g., as described above with reference to FIG. 3.

In some demonstrative embodiments, the first data sequence may include a first plurality of data samples corresponding to the data symbol $X_k$, and/or the second data sequence may include a second plurality of data samples corresponding to the data symbol $Y_k$, e.g., as described below.

In some demonstrative embodiments, the encoded repetition of the first and second data sequences may be based on an encoding of the time-space diversity scheme to be applied for the MIMO transmission, e.g., the time-space diversity scheme described above with reference to FIGS. 2 and/or 3, and/or any other time-space diversity scheme.

In some demonstrative embodiments, the encoded repetition of the first data sequence may include a time-inverted complex conjugate of the data samples corresponding to the data symbol $X_k$, and/or the encoded repetition of the second data sequence may include a time-inverted and sign-inverted complex conjugate of the data samples corresponding to the data symbol $Y_k$, e.g., as described below.

In some demonstrative embodiments, data mapper 125 may be configured to generate the first time-domain stream including the first data sequence, e.g., the data sequence corresponding to the data symbol $X_k$, in the first interval; and the second time-domain stream including the second data sequence, e.g., the data sequence corresponding to the data symbol $Y_k$, in the second interval, e.g., as described below.

In some demonstrative embodiments, data mapper 125 may be configured to generate the first time-domain stream including a time-inverted and sign-inverted complex conjugate of the second data sequence, e.g., a time-inverted and sign-inverted complex conjugate of the data sequence corresponding to the data symbol $Y_k$, in the second interval subsequent to the first interval; and the second time-domain stream including a time-inverted complex conjugate of the first data sequence, e.g., a time-inverted complex conjugate of the data sequence corresponding to the data symbol $X_k$, in the second interval, e.g., as described below.

In some demonstrative embodiments, controller 124 may include, operate as, and/or perform the functionality of a time-frequency converter 127, which may be configured to convert the plurality of time-domain streams into a respective plurality of frequency-domain streams in a frequency domain, e.g., as described below.

In some demonstrative embodiments, time-frequency converter 127 may be configured to convert the plurality of time-domain streams into the plurality of frequency-domain streams, for example, by applying a time-frequency conversion function to the plurality of time-domain streams.

In some demonstrative embodiments, time-frequency converter 127 may be configured to convert the plurality of time-domain streams into the plurality of frequency-domain streams, for example, by applying a Discrete Fourier Transform (DFT), e.g., as described below. In other embodiments, any other time-frequency conversion function may be used.

In some demonstrative embodiments, the first and second intervals, which may be used by data mapper 125 to map the first and second data sequences, may be based on the time-frequency conversion function implemented by time-frequency converter 127.

In some demonstrative embodiments, the first and second intervals may include first and second DFT intervals, e.g., first and second subsequent DFT intervals.

In some demonstrative embodiments, the first and second intervals may each have a size, denoted N, of the DFT ("DFT size") to be applied by time-frequency converter 127.

In other embodiments, the first and second intervals may have any other size and/or may include any other intervals, e.g., based on the size and/or type of the time-frequency conversion function.

In some demonstrative embodiments, controller 124 may include, operate as, and/or perform the functionality of a spatial stream mapper 129, which may be configured to map the plurality of frequency-domain streams to a plurality of spatial streams to be transmitted as part of the MIMO transmission, e.g., as described below.

In some demonstrative embodiments, spatial stream mapper 129 may be configured to map the plurality of frequency-domain streams to frequency subcarriers of a plurality of symbols according to a time-space diversity scheme, e.g., as described below.

In some demonstrative embodiments, spatial stream mapper 129 may be configured to map the plurality of frequency-domain streams to frequency subcarriers of a plurality of symbols according to an STBC scheme, e.g., as described below.

In some demonstrative embodiments, spatial stream mapper 129 may be configured to map the plurality of frequency-domain streams to frequency subcarriers of a plurality of symbols according to an Alamouti scheme, for example, as described above with reference to FIGS. 2 and/or 3.

In some demonstrative embodiments, spatial stream mapper 129 may be configured to map the plurality of frequency domain streams to at least a first frequency-domain spatial stream, e.g., spatial stream 302 (FIG. 3), and a second frequency-domain spatial stream, e.g., spatial stream 322 (FIG. 3).

In some demonstrative embodiments, spatial stream mapper 129 may map a first data symbol of the first data sequence, e.g., the data symbol $X_k$, to a subcarrier of a first frequency symbol, e.g., a first SC symbol, in the first frequency-domain spatial stream, e.g., the k-th subcarrier 308 (FIG. 3) of symbol 304 (FIG. 3) in stream 302 (FIG. 3).

In some demonstrative embodiments, spatial stream mapper 129 may map a second data symbol of the second data sequence, e.g., the data symbol $Y_k$, to the subcarrier of the first frequency symbol in the second frequency-domain spatial stream, e.g., the k-th subcarrier 328 (FIG. 3) of symbol 304 in stream 322 (FIG. 3).

In some demonstrative embodiments, spatial stream mapper 129 may map a sign-inverted complex conjugate of the second data symbol, e.g., the encoded data symbol $X_k^*$, to a subcarrier of a second frequency symbol, e.g., a second SC symbol, in the first frequency-domain spatial stream, e.g., the k-th subcarrier 330 (FIG. 3) of symbol 306 in stream 322 (FIG. 3).

In some demonstrative embodiments, spatial stream mapper 129 may map a complex conjugate of the first data symbol, e.g., the encoded data symbol $(-Y_k^*)$, to the subcarrier of the second frequency symbol, e.g., the k-th subcarrier 310 (FIG. 3) of symbol 306 in stream 302 (FIG. 3).

In some demonstrative embodiments, controller 124 may be configured to cause, trigger, and/or control the wireless station implemented by device 102 to transmit a MIMO transmission based on the plurality of frequency domain streams, for example, as mapped spatial stream mapper 129 to plurality of spatial streams, e.g., as described below.

In some demonstrative embodiments, controller 124 may be configured to cause, trigger, and/or control the wireless station implemented by device 102 to transmit the plurality of spatial streams via a plurality of antennas, e.g., including a plurality of directional antennas.

In some demonstrative embodiments, controller 124 may be configured to cause, trigger, and/or control the wireless station implemented by device 102 to transmit the first spatial stream, e.g., stream 302 (FIG. 1), via a first antenna of antennas 107, and to transmit the second spatial stream, e.g., stream 322 (FIG. 3), via a second antenna of antennas 107.

In some demonstrative embodiments, the MIMO transmission may include a 2×1 MIMO transmission, e.g., as described above. In other embodiments, the MIMO transmission may include any other $2 \times N_R$ MIMO transmission, or any other $M_T \times N_R$ MIMO transmission, e.g., wherein $M_T$ is an integer equal to or greater than 2, and $N_R$ is an integer equal to or greater than one.

In some demonstrative embodiments, the MIMO transmission may include an SC MIMO transmission, e.g., as described below.

In some demonstrative embodiments, controller 124 may be configured to cause, trigger, and/or control the wireless station implemented by device 102 to transmit the MIMO transmission over a directional frequency band, for example, a DMG band, or any other band.

In some demonstrative embodiments, a device, e.g., device 140 (FIG. 1) may be configured to receive and demodulate the MIMO transmission according to the time-space diversity scheme, e.g., as described below.

In some demonstrative embodiments, at the receiver side, e.g., at device 140, an Alamouti demodulation method may be used, for example, to combine 4 SC symbols from the first and second spatial streams, e.g., as shown in FIG. 3.

In some demonstrative embodiments, the received signals at the time t and the subsequent time t+T may be represented, for example, with respect to a 2×1 diversity scheme, e.g., as follows:

$$r_0 = r(t) = H_0 S_0 + H_1 S_1 + n_0$$

$$r_1 = r(t+T) = H_0(-S_1^*) + H_1(S_0^*) + n_1 \quad (1)$$

wherein $n_0$ and $n_1$ denote noise samples, and $S_0$ and $S_1$ denote the transmitted signals, e.g., corresponding to the transmitted data symbols.

In some demonstrative embodiments, first and second estimated signals, denoted $\tilde{S}_0$ and $\tilde{S}_1$, may be determined, for example, as follows:

$$\tilde{S}_0 = H_0^* r_0 + H_1 r_1^*$$

$$\tilde{S}_1 = H_1^* r_0 - H_0 r_1^* \quad (2)$$

In some demonstrative embodiments, the estimated signals $\tilde{S}_0$ and $\tilde{S}_1$ may be, for example, determined as follows:

$$\Rightarrow \tilde{S}_0 = (|H_0|^2 + |H_1|^2)S_0 + \underbrace{H_0^* H_1 S_1 - H_0^* H_1 S_1}_{=0} + H_1 n_1^* + H_0^* n_0 \quad (3)$$

$$\Rightarrow \tilde{S}_1 = (|H_0|^2 + |H_1|^2)S_1 + \underbrace{H_1^* H_0 S_0 - H_1^* H_0 S_0}_{=0} + H_1^* n_0 - H_0 n_1^*$$

In some demonstrative embodiments, this scheme may combine the channel gain, and may cancel out the inter stream components.

In some demonstrative embodiments, data mapper 125 may be configured to generate the plurality of time-domain streams according to a Guard Interval (GI) frame structure including one or more GI sequences, e.g., as described below.

In some demonstrative embodiments, data mapper 125 may be configured to map the one or more GI sequences to the plurality of time-domain streams, for example, based on the time-space diversity scheme to be applied by spatial stream mapper 129, e.g., as described below.

Figure 4:
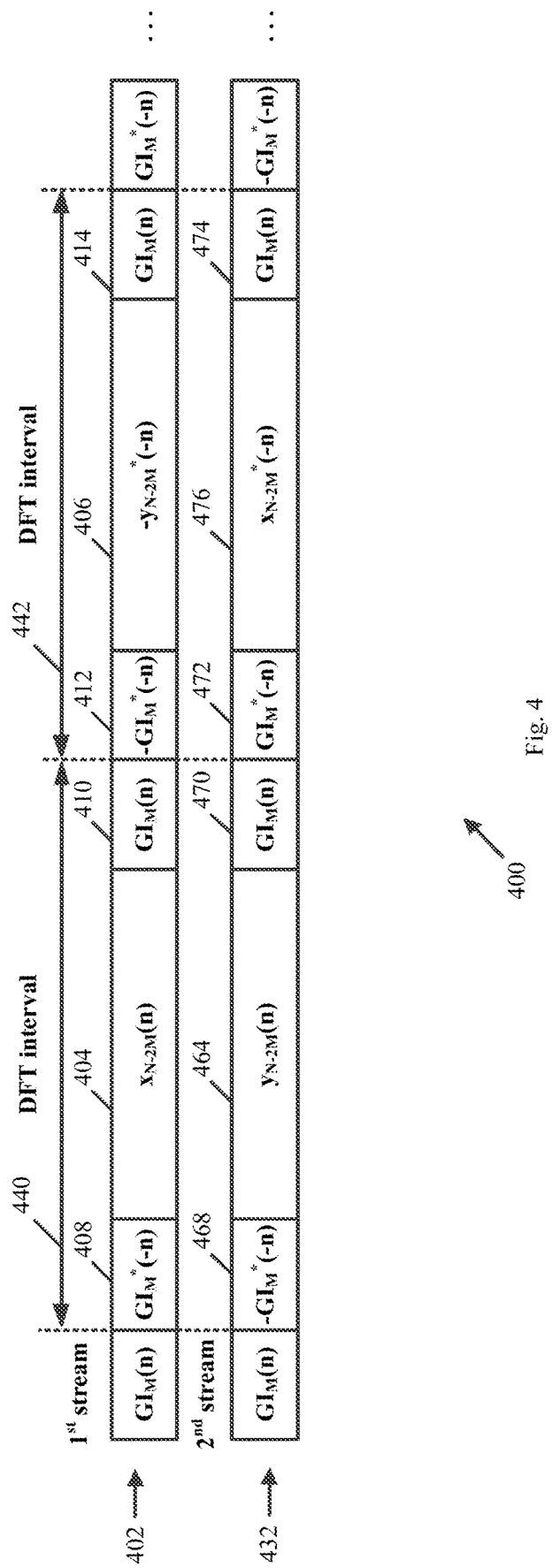
FIG. 4 is a schematic illustration of a frame structure, in accordance with some demonstrative embodiments.

In some demonstrative embodiments, data mapper 125 may be configured to map a GI sequence to the first interval in the first time-domain stream, for example, by inserting the GI sequence following the first data sequence, e.g., following the data sequence corresponding to the data symbol $X_k$, and inserting a time-inverted complex conjugate of the GI sequence prior to the first data sequence, e.g., prior to the data sequence corresponding to the data symbol $X_k$, e.g., as described below with reference to FIG. 4.

In some demonstrative embodiments, data mapper 125 may be configured to map the GI sequence to the second interval in the first time-domain stream, for example, by inserting the GI sequence following the time-inverted and sign-inverted complex conjugate of the second data sequence, and inserting a time-inverted and sign-inverted complex conjugate of the GI sequence prior to the time-inverted and sign-inverted complex conjugate of the second data sequence, e.g., as described below with reference to FIG. 4.

In some demonstrative embodiments, data mapper 125 may be configured to map a GI sequence to the first interval in the second time-domain stream, for example, by inserting the GI sequence following the second data sequence, e.g., following the data sequence corresponding to the data symbol $Y_k$, and inserting the time-inverted and sign-inverted complex conjugate of the GI sequence prior to the second data sequence, e.g., prior to the data sequence corresponding to the data symbol $Y_k$, e.g., as described below with reference to FIG. 4.

In some demonstrative embodiments, data mapper 125 may be configured to map the GI sequence to the second interval in the second time-domain stream, for example, by inserting the GI sequence following the time-inverted complex conjugate of the first data sequence, and inserting a time-inverted complex conjugate of the GI sequence prior to the time-inverted complex conjugate of the first data sequence, e.g., as described below with reference to FIG. 4.

In some demonstrative embodiments, the GI sequence may have a length of M samples, and each of the first and second data sequences may have a length of (N−2M) samples, for example, if the first and second intervals include DFT intervals with the DFT size of N.

In some demonstrative embodiments, the GI sequence may have a length of 32 samples or 64 samples. In other embodiments, the GI sequence may have any other length.

In some demonstrative embodiments, the GI sequence may include a Golay sequence, for example, a Golay sequence $Ga_{32}$, a Golay sequence $Ga_{64}$, or any other Golay sequence. In other embodiments, the GI sequence may include any other Golay or non-Golay sequence.

Reference is made to FIG. 4, which schematically illustrates a frame structure 400, in accordance with some demonstrative embodiments. For example, data mapper 125 (FIG. 1) may be configured to map data sequences to a plurality of time-domain streams according to the frame structure of FIG. 4.

In some demonstrative embodiments, the frame structure of FIG. 4 may be configured to support a 2×$N_R$ diversity MIMO transmission, for example, which may be implemented in accordance with a future IEEE 802.11ay Standard, and/or any other protocol, Standard and/or Specification.

In some demonstrative embodiments, the frame structure of FIG. 4 may be configured, for example, for SC PHY modulation with frequency domain equalization, e.g., to support at least a diversity scheme for 2×$N_R$ MIMO.

In some demonstrative embodiments, frame structure 400 may include a first time-domain stream 402, and a second time domain stream 432, e.g., as described below.

In some demonstrative embodiments, as shown in FIG. 4, frame structure 400 may be configured to map two data sequences to two consecutive intervals, e.g., an interval 440 and an interval 442 subsequent to interval 440, in first stream 402 and second stream 432.

In some demonstrative embodiments, the first time-domain stream 402 and the second time-domain stream 432 may be configured to be converted, e.g., by time-frequency converter 127 (FIG. 1), to a frequency domain, and mapped, e.g., by spatial stream mapper 129 (FIG. 1), to first and second spatial streams, for example, the spatial streams 302 and 322 (FIG. 3), according to a space-time diversity scheme, e.g., as described above.

In some demonstrative embodiments, the first interval 440 may include a first DFT interval, and the second interval 442 may include a second DFT interval, for example, according to a size of a DFT interval of a DFT to be applied to frame structure 400, e.g., by time-frequency converter 127 (FIG. 1).

In some demonstrative embodiments, data mapped to the interval 440 of streams 402 and 432 may be transmitted in a first SC symbol transmission at a first time, e.g., at the time T; and data mapped to the interval 442 of streams 402 and 432 may be transmitted in a second SC symbol transmission at a second time, e.g., at the time T+t, subsequent to the first time, e.g., as described below.

In some demonstrative embodiments, as shown in FIG. 4, frame structure 400 may be configured to map to intervals 440 and 442 a first data sequence, e.g., a data sequence $x_{N-2M}(n)$, and a second data sequence, e.g., a data sequence $y_{N-2M}(n)$, to be transmitted, for example, in a single SC symbol having a size of (N−2M) samples.

For example, the data sequence $x_{N-2M}(n)$ may include (N−2M) samples, e.g., $x_{N-2M}=[x_1, x_2, \ldots, x_{N-2M-1}, z_{N-2M}]$; and/or the data sequence $y_{N-2M}(n)$ may include (N−2M) samples, e.g., $y_{N-2M}=[y_1, y_2, \ldots, y_{N-2M-1}, y_{N-2M}]$. For example, N may denote the DFT size, for example, of a DFT to be applied to frame structure 400, e.g., by time-frequency converter 127 (FIG. 1).

In some demonstrative embodiments, according to frame structure 400, the first interval 440 in the first time-domain stream 402 may include a first data sequence 404 including the data sequence $x_{N-2M}(n)$, and the first interval 440 in the second time-domain stream 432 may include a second data sequence 464 including the data sequence $y_{N-2M}(n)$.

In some demonstrative embodiments, according to frame structure 400, the first data sequence $x_{N-2M}(n)$ may be repeated with encoding in the second interval 442 of the second time-domain stream 432, e.g., to be transmitted in a subsequent SC symbol transmission. For example, the second interval 442 of the second time-domain stream 432 may include a time inversion and complex conjugation 476 of the first data sequence 404. For example, as shown in FIG. 4, the subsequent SC symbol corresponding to the interval 442 in the second stream 432 may include the sequence $x_{N-2M}(-n)^* = [x_{N-2M}^*, x_{N-2M-1}^*, \ldots, x_2^*, x_1^*]$.

In some demonstrative embodiments, according to frame structure 400, the second data sequence $y_{N-2M}(n)$ may be repeated with encoding in the second interval 442 of the first stream 402, e.g., to be transmitted in the subsequent SC symbol transmission. For example, the second interval 442 of the first time-domain stream 402 may include a time inversion, complex conjugation and sign inversion 406 of the second data sequence 464. For example, as shown in FIG. 4, the subsequent SC symbol corresponding to the interval 442 in the first stream 402 may include the sequence $-y_{N-2M}(-n)^* = [-y_{N-2M}^*, -y_{N-2M-1}^*, \ldots, -y_2^*, -y_1^*]$.

In some demonstrative embodiments, according to frame structure 400, a GI sequence may be mapped to the first interval 440 of the streams 402 and 432, and to the second interval 442 of the streams 402 and 432, e.g., as described below.

In some demonstrative embodiments, the GI may include a GI sequence, denoted $GI_M(n)$, including a GI complex sequence of M samples, wherein the index n=1 ... M, e.g., $GI_M(n) = [a_1, a_2, \ldots, a_{M-1}, a_M]$.

In one example, the sequence $GI_M(n)$ may include a Golay sequence with a size of M, e.g., based on the Golay sequence $Ga_{32}$, the Golay sequence $Ga_{64}$, or any other Golay sequence. In other embodiments, the sequence $GI_M(n)$ may include any other Golay or non-Golay sequence.

In some demonstrative embodiments, according to frame structure 400, the first interval 440 of stream 402 may include a GI sequence 410, e.g., $GI_M(n)$, following the data sequence 404; and an encoded repetition 408, e.g., time-inverted complex conjugate, e.g., $GI_M^*(-n)$, of the GI sequence 410, prior to the data sequence 404. For example, the sequence $GI_M^*(-n)$ may include a complex conjugated GI sequence with time inversion, e.g., $GI_M^*(-n) = [a_M^*, a_{M-1}^*, \ldots, a_2^*, a_1^*]$. For example, the sequence $GI_M^*(n)$ may denote a sequence including a complex conjugated sequence to $GI_M(n)$, e.g., $GI_M^*(n) = [a_1^*, a_2^*, \ldots, a_{M-1}^*, a_M^*]$.

In some demonstrative embodiments, according to frame structure 400, the first interval 440 of stream 432 may include a GI sequence 470, e.g., $GI_M(n)$, following the data sequence 464; and an encoded repletion 468, e.g., a time-inverted and sign-inverted complex conjugate, e.g., $-GI_M^*$ (-n), of the GI sequence 410, prior to the data sequence 464. For example, the GI sequence $-GI_M^*(-n)$ may include a sign inverted complex conjugated GI sequence with time inversion.

In some demonstrative embodiments, according to frame structure 400, the second interval 442 of stream 402 may include a GI sequence 414, e.g., $GI_M(n)$, following the data sequence 406; and an encoded repetition 412, e.g., a time-inverted and sign-inverted complex conjugate, e.g., $-GI_M^*$ (-n), of the GI sequence 414, prior to the data sequence 406.

In some demonstrative embodiments, according to frame structure 400, the second interval 442 of stream 432 may include a GI sequence 474, e.g., $GI_M(n)$, following the data sequence 476, and an encoded repetition 472, e.g., a time-inverted complex conjugate, e.g., $GI_M^*(-n)$, of the GI sequence 474, prior to the data sequence 476.

In some demonstrative embodiments, the symbol structure shown in FIG. 4 may be, for example, repeated for one or more additional subsequent SC symbols, e.g., for one or more subsequent pairs of SC symbols.

In some demonstrative embodiments, mapping the data sequences and GI sequences according to the frame structure 400 may allow, for example, generating a subcarrier mapping, for example, according to the subcarrier mapping of FIG. 3, e.g., due to the DFT property. Accordingly, the frame structure of FIG. 4 may allow, for example, application of a diversity scheme, e.g., based on an Alamouti transmit diversity technique, in the frequency domain.

In some demonstrative embodiments, as shown in FIG. 4, the frame structure 400 may include GIs, e.g., known GIs, which may be used, for example, for one or more PHY estimations at a receiver side.

Figure 5:
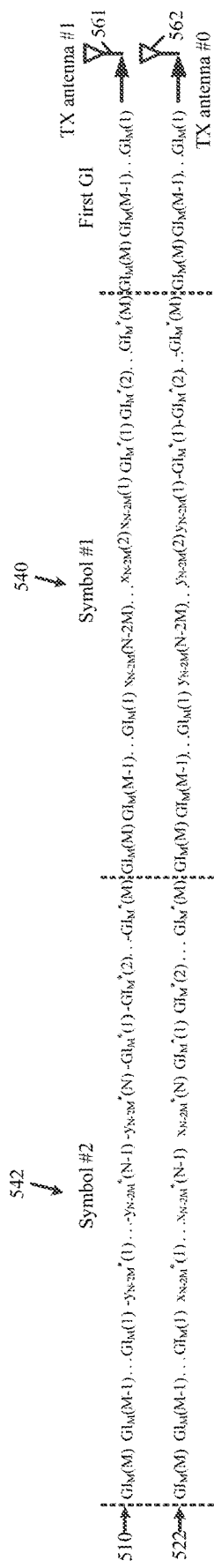
FIG. 5 is a schematic illustration of symbols mapped to first and second spatial streams according to a transmit diversity scheme, in accordance with some demonstrative embodiments.

Reference is made to FIG. 5, which schematically illustrates symbols mapped to a first spatial stream 510 and a second spatial stream 520 according to a transmit diversity scheme, in accordance with some demonstrative embodiments. For example, the symbols of streams 510 and 520 may include the symbols of time-domain streams 402 and 432 (FIG. 4), respectively.

For example, the transmit diversity scheme of FIG. 5 may support SC modulation with frequency domain equalization for $2 \times N_R$ MIMO, for example, with known guard intervals, e.g., according to the frame structure of FIG. 4.

In some demonstrative embodiments, as may be seen from a comparison between FIG. 5 and FIG. 2, there may be some modifications made to allow, for example, to support data mapping in time domain for SC modulation with frequency domain equalization, e.g., using the frame structure of FIG. 4.

In some demonstrative embodiments, as shown in FIG. 5, a first symbol 540, e.g., corresponding to a first SC symbol, may include the sequences 408, 404 and 410 (FIG. 4), in the first stream 510 to be transmitted via a first antenna 561, e.g., at a first time, e.g., the time T.

In some demonstrative embodiments, as shown in FIG. 5, the first symbol 540, e.g., the first SC symbol, may include the sequences 468, 464 and 470 (FIG. 4), in the second stream 520 to be transmitted via a second antenna 521, e.g., at the first time.

In some demonstrative embodiments, as shown in FIG. 5, a second symbol 542, e.g., corresponding to a second SC symbol, subsequent to the symbol 540, may include the sequences 412, 406 and 414 (FIG. 4), in the first stream 510 to be transmitted via first antenna 561, e.g., at a second time subsequent to the first time, e.g., the time T+t.

In some demonstrative embodiments, as shown in FIG. 5, the second symbol 542, e.g., the second SC symbol, may include the sequences 472, 476, and 474 (FIG. 4), in the second stream 520 to be transmitted via second antenna 521, e.g., at the second time.

Referring back to FIG. 1, in some demonstrative embodiments, data mapper 125 may be configured to generate the plurality of time-domain streams according to a Cyclic Prefix (CP) frame structure including one or more CP sequences, e.g., as described below.

In some demonstrative embodiments, data mapper 125 may be configured to generate the time-domain streams including CP extensions, e.g., as described below.

Figure 6:
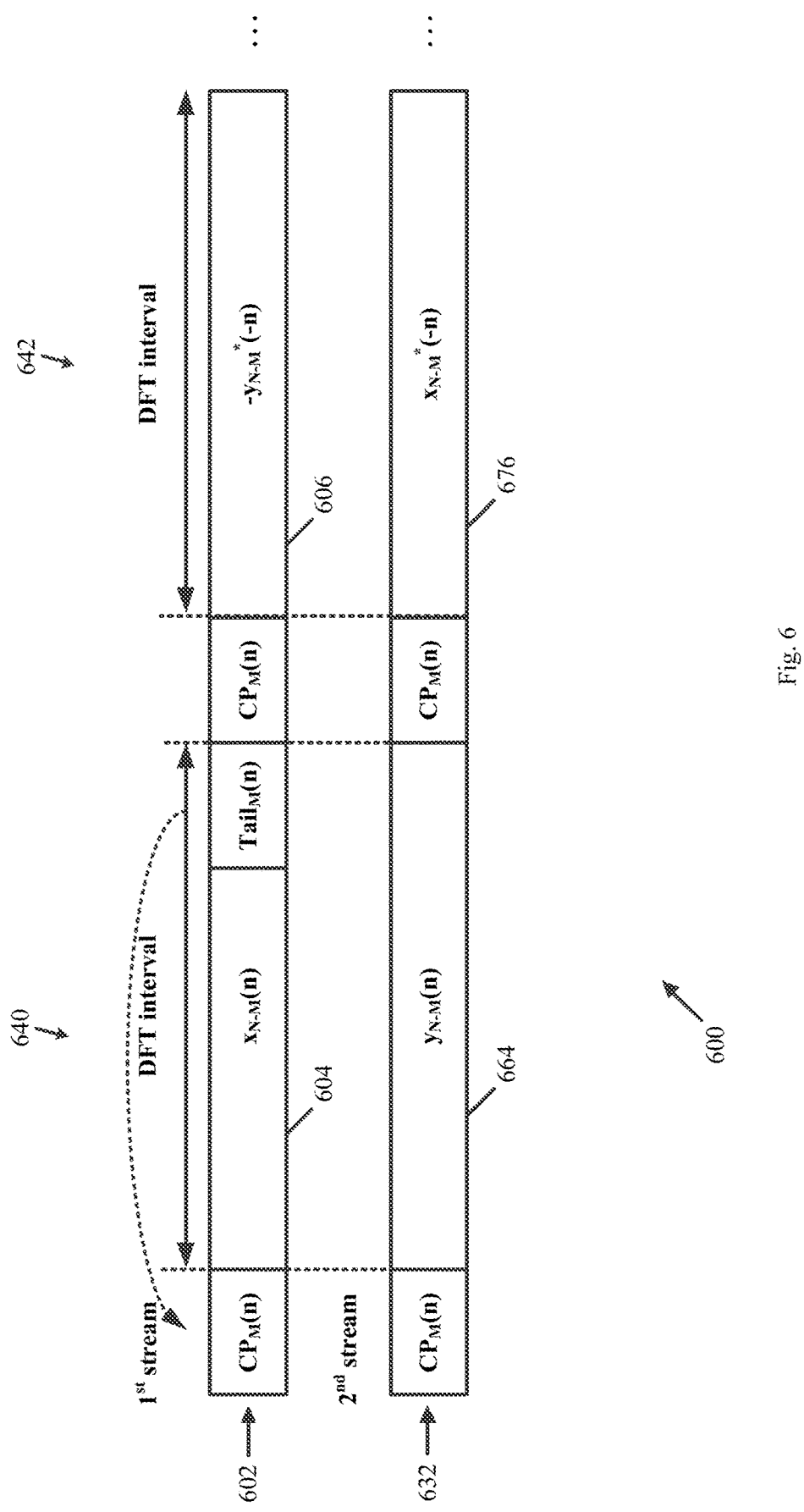
FIG. 6 is a schematic illustration of a frame structure, in accordance with some demonstrative embodiments.

FIG. 6 is a schematic illustration of a frame structure 600, in accordance with some demonstrative embodiments. For example, data mapper 125 (FIG. 1) may be configured to map data sequences to a plurality of time-domain streams according to the frame structure of FIG. 6.

In some demonstrative embodiments, the frame structure of FIG. 6 may be configured to support a $2 \times N_R$ diversity MIMO transmission, for example, which may be implemented in accordance with a future IEEE 802.11ay Standard.

In some demonstrative embodiments, the frame structure of FIG. 6 may be configured, for example, for SC PHY modulation with frequency domain equalization, e.g., to support at least a diversity scheme for $2 \times N_R$ MIMO.

In some demonstrative embodiments, the frame structure of FIG. 6 may include a CP. The CP may include, for example, a CP of a size of M samples, which may include a data tail copied to the beginning of the symbol.

In some demonstrative embodiments, as shown in FIG. 6, one or more of the operations described above with respect to the data symbols $x_{N-2M}(n)$ and/or $y_{N-2M}(n)$ may be applied with respect to the size of (N−M) samples.

In some demonstrative embodiments, frame structure 600 may include a first time-domain stream 602, and a second time domain stream 632, e.g., as described below.

In some demonstrative embodiments, as shown in FIG. 6, frame structure 600 may be configured to map two data sequences to two consecutive intervals, e.g., an interval 640 and an interval 642 subsequent to interval 640, in first stream 602 and second stream 632.

In some demonstrative embodiments, the first time-domain stream 602 and the second time-domain stream 632 may be configured to be converted, e.g., by time-frequency converter 127 (FIG. 1), to a frequency domain, and mapped, e.g., by spatial stream mapper 129 (FIG. 1), to first and second spatial streams, for example, the spatial streams 302 and 322 (FIG. 3), according to a space-time diversity scheme, e.g., as described above.

In some demonstrative embodiments, the first interval 640 may include a first DFT interval, and the second interval 642 may include a second DFT interval, for example, according to a DFT size of a DFT to be applied to frame structure 600, e.g., by time-frequency converter 127 (FIG. 1).

In some demonstrative embodiments, data mapped to the interval 640 of streams 602 and 632 may be transmitted in a first SC symbol transmission at a first time, e.g., at the time T; and data mapped to the interval 642 of streams 602 and 632 may be transmitted in a second SC symbol transmission at a second time, e.g., at the time T+t, subsequent to the first time, e.g., as described below.

In some demonstrative embodiments, as shown in FIG. 6, frame structure 600 may be configured to map to intervals 640 and 642 a first data sequence, e.g., the data sequence $x_{N-M}(n)$, and a second data sequence, e.g., the data sequence $y_{N-M}(n)$, to be transmitted, for example, in a single SC symbol having a size of (N−2M) samples.

In some demonstrative embodiments, according to frame structure 600, the first interval 640 in the first time-domain stream 602 may include a first data sequence 604 including the data sequence $x_{N-M}(n)$, and the first interval 640 in the second time-domain stream 632 may include a second data sequence 664 including the data sequence $y_{N-M}(n)$.

In some demonstrative embodiments, according to frame structure 600, the first data sequence $x_{N-M}(n)$ may be repeated with encoding in the second interval 642 of the second time-domain stream 632, e.g., to be transmitted in a subsequent SC symbol transmission. For example, the second interval 642 of the second time-domain stream 632 may include a time inversion and complex conjugation 676 of the first data sequence 604. For example, as shown in FIG. 6, the subsequent SC symbol corresponding to the interval 642 in the second stream 632 may include the sequence $x_{N-M}(-n)^* = [x_{N-M}^*, x_{N-M-1}^*, \ldots, x_2^*, x_1^*]$.

In some demonstrative embodiments, according to frame structure 600, the second data sequence $y_{N-M}(n)$ may be repeated with encoding in the second interval 642 of the first stream 602, e.g., to be transmitted in the subsequent SC symbol transmission. For example, the second interval 642 of the first time-domain stream 602 may include a time inversion, complex conjugation and sign inversion 606 of the second data sequence 664. For example, as shown in FIG. 6, the subsequent SC symbol corresponding to the interval 642 in the first stream 602 may include the sequence $-y_{N-M}(-n)^* = [-y_{N-2M}^*, -y_{N-2M-1}^*, \ldots, -y_2^*, -y_1^*]$.

In some demonstrative embodiments, the frame structure 600 may include a CP extension applied with respect to the data sequences in the intervals 640 and 642 of each of the streams 602 and 632.

In some demonstrative embodiments, as shown in FIG. 6, the CP applied to a symbol may include, for example, a CP of a size of M samples, which may include a data tail of a data sequence in the symbol copied to the beginning of the symbol.

Figure 7:
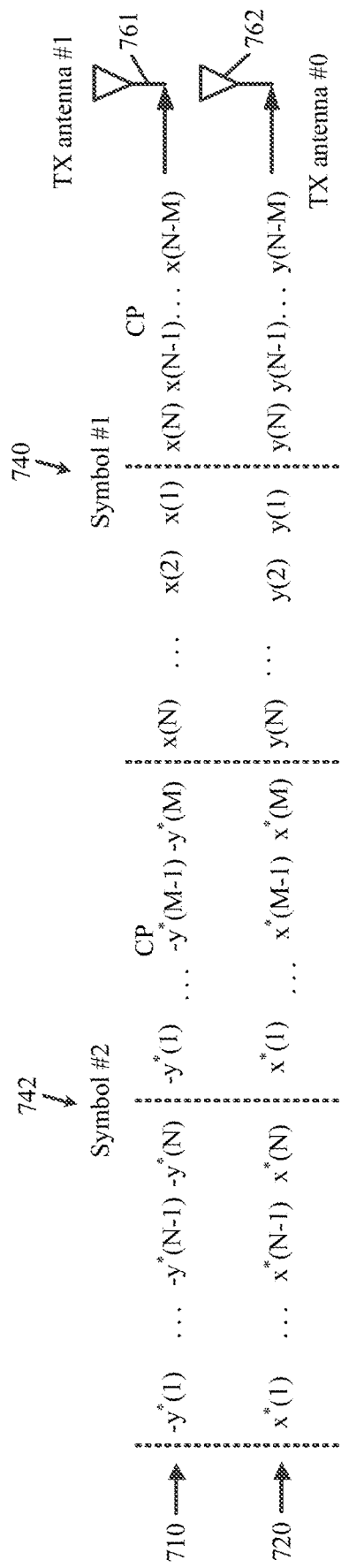
FIG. 7 is a schematic illustration of symbols mapped to first and second spatial streams according to a transmit diversity scheme, in accordance with some demonstrative embodiments.

Reference is made to FIG. 7, which schematically illustrates symbols mapped to a first spatial stream 710 and a second spatial stream 720 according to a transmit diversity scheme, in accordance with some demonstrative embodiments. For example, the symbols of streams 710 and 720 may include the symbols of time-domain streams 602 and 632 (FIG. 6), respectively.

For example, the transmit diversity scheme of FIG. 7 may support SC modulation with frequency domain equalization for $2 \times N_R$ MIMO, for example, with CP extensions, e.g., according to the frame structure of FIG. 6.

In some demonstrative embodiments, as may be seen from a comparison between FIG. 7 and FIG. 2, there may be some modifications made to allow, for example, to support data mapping in time domain for SC modulation with frequency domain equalization, e.g., using the frame structure of FIG. 6.

In some demonstrative embodiments, as shown in FIG. 7, a first symbol 740, e.g., corresponding to a first SC symbol, may include the CP extension $CP_M(n)$ corresponding to the sequence 640 (FIG. 6), which may be followed by the sequence 640 (FIG. 6), in the first stream 710 to be transmitted via a first antenna 761, e.g., at a first time, e.g., the time T.

In some demonstrative embodiments, as shown in FIG. 7, the first symbol 740, e.g., the first SC symbol, may include the CP extension $CP_M(n)$ corresponding to the sequence 664 (FIG. 6), which may be followed by the sequence 664 (FIG. 6), in the second stream 720 to be transmitted via a second antenna 721, e.g., at the first time.

In some demonstrative embodiments, as shown in FIG. 7, a second symbol 742, e.g., corresponding to a second SC symbol, subsequent to the symbol 740, may include the CP extension $CP_M(n)$ corresponding to the encoded sequence 606 (FIG. 6), which may be followed by the encoded sequence 606 (FIG. 6), in the first stream 710 to be transmitted via first antenna 761, e.g., at a second time subsequent to the first time, e.g., the time T+t.

In some demonstrative embodiments, as shown in FIG. 7, the second symbol 742, e.g., the second SC symbol, may include the CP extension $CP_M(n)$ corresponding to the encoded sequence 676 (FIG. 6), which may be followed by the encoded sequence 676 (FIG. 6), in the second stream 720 to be transmitted via second antenna 721, e.g., at the second time.

Figure 8:
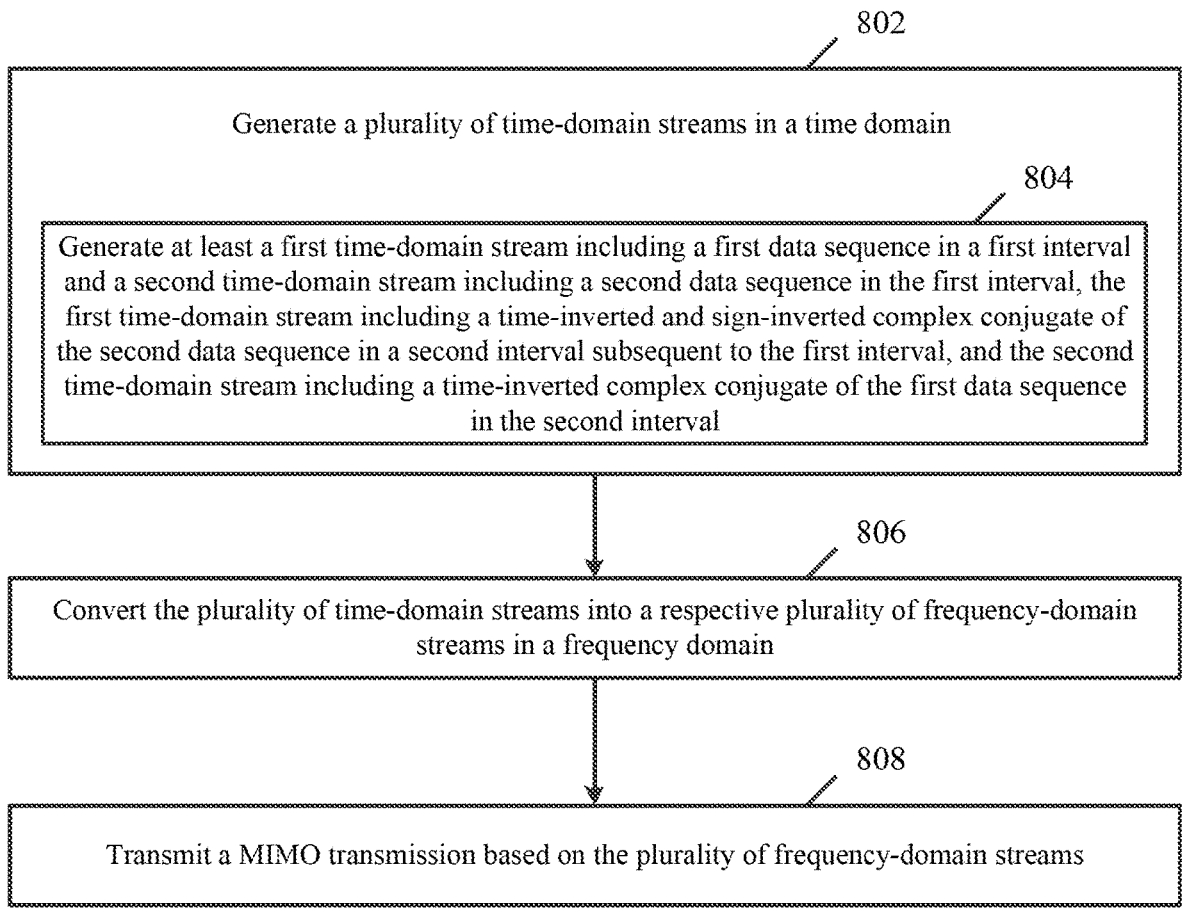
FIG. 8 is a schematic illustration of a method of communicating a Multiple-Input-Multiple-Output (MIMO) transmission, in accordance with some demonstrative embodiments.

Reference is made to FIG. 8, which schematically illustrates a method of communicating a MIMO transmission, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 802, the method may include generating a plurality of time-domain streams in a time domain. For example, controller 124 (FIG. 1) may be configured to cause, trigger, and/or control the wireless station implemented by device 102 (FIG. 1) to generate a plurality of time-domain streams in a time domain, for example, based on data to be transmitted, e.g., as described above.

As indicated at block 804, the method may include generating at least a first time-domain stream including a first data sequence in a first interval and a second time-domain stream including a second data sequence in the first interval, the first time-domain stream including a time-inverted and sign-inverted complex conjugate of the second data sequence in a second interval subsequent to the first interval, and the second time-domain stream including a time-inverted complex conjugate of the first data sequence in the second interval. For example, controller 124 (FIG. 1) may be configured to cause, trigger, and/or control the wireless station implemented by device 102 (FIG. 1) to generate the first and second time-domain streams, for example, according to frame structure 400 (FIG. 4) or frame structure 600 (FIG. 6), e.g., as described above.

As indicated at block 806, the method may include converting the plurality of time-domain streams into a respective plurality of frequency-domain streams in a frequency domain. For example, controller 124 (FIG. 1) may be configured to cause, trigger, and/or control the wireless station implemented by device 102 (FIG. 1) to convert the plurality of time-domain streams into the plurality of frequency-domain streams in the frequency domain, for example, according to a DFT, e.g., as described above.

As indicated at block 808, the method may include transmitting a MIMO transmission based on the plurality of frequency-domain streams. For example, controller 124 (FIG. 1) may be configured to cause, trigger, and/or control the wireless station implemented by device 102 (FIG. 1) to transmit a MIMO transmission based on the plurality of frequency domain streams, for example, according to the time-space diversity scheme of FIG. 5 or the time-space diversity scheme of FIG. 7, e.g., as described above.

Figure 9:
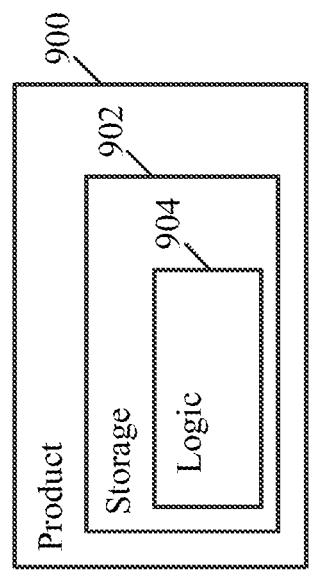
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable non-transitory storage media 902, which may include computer-executable instructions, e.g., implemented by logic 904, operable to, when executed by at least one computer processor, enable the at least one computer processor to implement one or more operations at devices 102 and/or 140 (FIG. 1), transmitters 118 and/or 148 (FIG. 1), receivers 116 and/or 146 (FIG. 1), controllers 124 and/or 154 (FIG. 1), to perform one or more of the operations and/or communications according to FIGS. 1, 2, 3, 4, 5, 6, 7, and/or 8, and/or to perform one or more operations of a method, e.g., as described herein. The phrase "non-transitory machine-readable medium" is directed to include all computer-readable media, with the sole exception being a transitory propagating signal.

In some demonstrative embodiments, product 900 and/or machine-readable storage medium 902 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to generate a plurality of time-domain streams in a time domain, the plurality of time-domain streams comprising at least a first time-domain stream comprising a first data sequence in a first interval and a second time-domain stream comprising a second data sequence in the first interval, the first time-domain stream comprises a time-inverted and sign-inverted complex conjugate of the second data sequence in a second interval subsequent to the first interval, and the second time-domain stream comprises a time-inverted complex conjugate of the first data sequence in the second interval; convert the plurality of time-domain streams into a respective plurality of frequency-domain streams in a frequency domain; and transmit a Multiple-Input-Multiple-Output (MIMO) transmission based on the plurality of frequency-domain streams.

Example 2 includes the subject matter of Example 1, and optionally, wherein, in the first interval, the first time-domain stream comprises a Guard Interval (GI) sequence following the first data sequence, and a time-inverted complex conjugate of the GI sequence prior to the first data sequence, and wherein, in the second interval, the first time-domain stream comprises the GI sequence following the time-inverted and sign-inverted complex conjugate of the second data sequence, and a time-inverted and sign-inverted complex conjugate of the GI sequence prior to the time-inverted and sign-inverted complex conjugate of the second data sequence.

Example 3 includes the subject matter of Example 2, and optionally, wherein, in the first interval, the second time-domain stream comprises the GI sequence following the second data sequence, and the time-inverted and sign-inverted complex conjugate of the GI sequence prior to the second data sequence, and wherein, in the second interval, the second time-domain stream comprises the GI sequence following the time-inverted complex conjugate of the first data sequence, and the time-inverted complex conjugate of the GI sequence prior to the time-inverted complex conjugate of the first data sequence.

Example 4 includes the subject matter of Example 2 or 3, and optionally, wherein the GI sequence has a length of M samples, and each of the first and second data sequences has a length of (N−2M) samples, wherein N denotes a Discrete Fourier Transform (DFT) size of each of the first and second intervals.

Example 5 includes the subject matter of any one of Examples 2-4, and optionally, wherein the GI sequence has a length of 32 samples or 64 samples.

Example 6 includes the subject matter of any one of Examples 2-5, and optionally, wherein the GI sequence comprises a Golay sequence.

Example 7 includes the subject matter of any one of Examples 1-6, and optionally, wherein the apparatus is configured to cause the wireless station to map the plurality of frequency domain streams to a plurality of frequency domain spatial streams according to a Space Time Block Code (STBC) scheme.

Example 8 includes the subject matter of Example 7, and optionally, wherein the STBC scheme comprises an Alamouti scheme.

Example 9 includes the subject matter of any one of Examples 1-8, and optionally, wherein the apparatus is configured to cause the wireless station to map the plurality of frequency domain streams to at least a first frequency-domain spatial stream and a second frequency-domain spatial stream, the first frequency-domain spatial stream comprising a first data symbol of the first data sequence mapped to a subcarrier of a first frequency symbol, the second frequency-domain spatial stream comprising a second data symbol of the second data sequence mapped to the subcarrier of the first frequency symbol, the first frequency-domain spatial stream comprising a sign-inverted complex conjugate of the second data symbol mapped to a subcarrier of a second frequency symbol, the second frequency-domain spatial stream comprising a complex conjugate of the first data symbol mapped to the subcarrier of the second frequency symbol.

Example 10 includes the subject matter of any one of Examples 1-9, and optionally, wherein the first and second time-domain streams comprise Cyclic Prefix (CP) extensions.

Example 11 includes the subject matter of any one of Examples 1-10, and optionally, wherein the apparatus is configured to cause the wireless station to transmit a first spatial stream of the MIMO transmission via a first antenna and a second spatial stream of the MIMO transmission via a second antenna.

Example 12 includes the subject matter of any one of Examples 1-11, and optionally, wherein the MIMO transmission comprises a Single Carrier (SC) MIMO transmission.

Example 13 includes the subject matter of any one of Examples 1-12, and optionally, wherein the MIMO transmission comprises a 2×$N_R$ MIMO transmission, wherein $N_R$ is an integer equal to or greater than 1.

Example 14 includes the subject matter of any one of Examples 1-13, and optionally, wherein the apparatus is configured to cause the wireless station to transmit the MIMO transmission over a Directional Multi-Gigabit (DMG) band.

Example 15 includes the subject matter of any one of Examples 1-14, and optionally, wherein the wireless station is a Directional Multi-Gigabit (DMG) Station (STA).

Example 16 includes the subject matter of any one of Examples 1-15, and optionally, comprising a plurality of directional antennas to transmit the MIMO transmission.

Example 17 includes the subject matter of any one of Examples 1-16, and optionally, comprising a radio, a memory, and a processor.

Example 18 includes a system of wireless communication comprising a wireless station, the wireless station comprising a plurality of directional antennas; a radio; a memory; a processor; and a controller configured to cause the wireless station to generate a plurality of time-domain streams in a time domain, the plurality of time-domain streams comprising at least a first time-domain stream comprising a first data sequence in a first interval and a second time-domain stream comprising a second data sequence in the first interval, the first time-domain stream comprises a time-inverted and sign-inverted complex conjugate of the second data sequence in a second interval subsequent to the first interval, and the second time-domain stream comprises a time-inverted complex conjugate of the first data sequence in the second interval; convert the plurality of time-domain streams into a respective plurality of frequency-domain streams in a frequency domain; and transmit a Multiple-Input-Multiple-Output (MIMO) transmission based on the plurality of frequency-domain streams.

Example 19 includes the subject matter of Example 18, and optionally, wherein, in the first interval, the first time-domain stream comprises a Guard Interval (GI) sequence following the first data sequence, and a time-inverted complex conjugate of the GI sequence prior to the first data sequence, and wherein, in the second interval, the first time-domain stream comprises the GI sequence following the time-inverted and sign-inverted complex conjugate of the second data sequence, and a time-inverted and sign-inverted complex conjugate of the GI sequence prior to the time-inverted and sign-inverted complex conjugate of the second data sequence.

Example 20 includes the subject matter of Example 19, and optionally, wherein, in the first interval, the second time-domain stream comprises the GI sequence following the second data sequence, and the time-inverted and sign-inverted complex conjugate of the GI sequence prior to the second data sequence, and wherein, in the second interval, the second time-domain stream comprises the GI sequence following the time-inverted complex conjugate of the first data sequence, and the time-inverted complex conjugate of the GI sequence prior to the time-inverted complex conjugate of the first data sequence.

Example 21 includes the subject matter of Example 19 or 20, and optionally, wherein the GI sequence has a length of M samples, and each of the first and second data sequences has a length of (N−2M) samples, wherein N denotes a Discrete Fourier Transform (DFT) size of each of the first and second intervals.

Example 22 includes the subject matter of any one of Examples 19-21, and optionally, wherein the GI sequence has a length of 32 samples or 64 samples.

Example 23 includes the subject matter of any one of Examples 19-22, and optionally, wherein the GI sequence comprises a Golay sequence.

Example 24 includes the subject matter of any one of Examples 18-23, and optionally, wherein the wireless station is to map the plurality of frequency domain streams to a plurality of frequency domain spatial streams according to a Space Time Block Code (STBC) scheme.

Example 25 includes the subject matter of Example 24, and optionally, wherein the STBC scheme comprises an Alamouti scheme.

Example 26 includes the subject matter of any one of Examples 18-25, and optionally, wherein the wireless station is to map the plurality of frequency domain streams to at least a first frequency-domain spatial stream and a second frequency-domain spatial stream, the first frequency-domain spatial stream comprising a first data symbol of the first data sequence mapped to a subcarrier of a first frequency symbol, the second frequency-domain spatial stream comprising a second data symbol of the second data sequence mapped to the subcarrier of the first frequency symbol, the first frequency-domain spatial stream comprising a sign-inverted complex conjugate of the second data symbol mapped to a subcarrier of a second frequency symbol, the second frequency-domain spatial stream comprising a complex conjugate of the first data symbol mapped to the subcarrier of the second frequency symbol.

Example 27 includes the subject matter of any one of Examples 18-26, and optionally, wherein the first and second time-domain streams comprise Cyclic Prefix (CP) extensions.

Example 28 includes the subject matter of any one of Examples 18-27, and optionally, wherein the wireless station is to transmit a first spatial stream of the MIMO transmission via a first antenna and a second spatial stream of the MIMO transmission via a second antenna.

Example 29 includes the subject matter of any one of Examples 18-28, and optionally, wherein the MIMO transmission comprises a Single Carrier (SC) MIMO transmission.

Example 30 includes the subject matter of any one of Examples 18-29, and optionally, wherein the MIMO transmission comprises a $2 \times N_R$ MIMO transmission, wherein $N_R$ is an integer equal to or greater than 1.

Example 31 includes the subject matter of any one of Examples 18-30, and optionally, wherein the wireless station is to transmit the MIMO transmission over a Directional Multi-Gigabit (DMG) band.

Example 32 includes the subject matter of any one of Examples 18-31, and optionally, wherein the wireless station is a Directional Multi-Gigabit (DMG) Station (STA).

Example 33 includes a method to be performed at a wireless station, the method comprising generating a plurality of time-domain streams in a time domain, the plurality of time-domain streams comprising at least a first time-domain stream comprising a first data sequence in a first interval and a second time-domain stream comprising a second data sequence in the first interval, the first time-domain stream comprises a time-inverted and sign-inverted complex conjugate of the second data sequence in a second interval subsequent to the first interval, and the second time-domain stream comprises a time-inverted complex conjugate of the first data sequence in the second interval; converting the plurality of time-domain streams into a respective plurality of frequency-domain streams in a frequency domain; and transmitting a Multiple-Input-Multiple-Output (MIMO) transmission based on the plurality of frequency-domain streams.

Example 34 includes the subject matter of Example 33, and optionally, wherein, in the first interval, the first time-domain stream comprises a Guard Interval (GI) sequence following the first data sequence, and a time-inverted complex conjugate of the GI sequence prior to the first data sequence, and wherein, in the second interval, the first time-domain stream comprises the GI sequence following the time-inverted and sign-inverted complex conjugate of the second data sequence, and a time-inverted and sign-inverted complex conjugate of the GI sequence prior to the time-inverted and sign-inverted complex conjugate of the second data sequence.

Example 35 includes the subject matter of Example 34, and optionally, wherein, in the first interval, the second time-domain stream comprises the GI sequence following the second data sequence, and the time-inverted and sign-inverted complex conjugate of the GI sequence prior to the second data sequence, and wherein, in the second interval, the second time-domain stream comprises the GI sequence following the time-inverted complex conjugate of the first data sequence, and the time-inverted complex conjugate of the GI sequence prior to the time-inverted complex conjugate of the first data sequence.

Example 36 includes the subject matter of Example 34 or 35, and optionally, wherein the GI sequence has a length of M samples, and each of the first and second data sequences has a length of (N−2M) samples, wherein N denotes a Discrete Fourier Transform (DFT) size of each of the first and second intervals.

Example 37 includes the subject matter of any one of Examples 34-36, and optionally, wherein the GI sequence has a length of 32 samples or 64 samples.

Example 38 includes the subject matter of any one of Examples 34-37, and optionally, wherein the GI sequence comprises a Golay sequence.

Example 39 includes the subject matter of any one of Examples 33-38, and optionally, comprising mapping the plurality of frequency domain streams to a plurality of frequency domain spatial streams according to a Space Time Block Code (STBC) scheme.

Example 40 includes the subject matter of Example 39, and optionally, wherein the STBC scheme comprises an Alamouti scheme.

Example 41 includes the subject matter of any one of Examples 33-40, and optionally, comprising mapping the plurality of frequency domain streams to at least a first frequency-domain spatial stream and a second frequency-domain spatial stream, the first frequency-domain spatial stream comprising a first data symbol of the first data sequence mapped to a subcarrier of a first frequency symbol, the second frequency-domain spatial stream comprising a second data symbol of the second data sequence mapped to the subcarrier of the first frequency symbol, the first frequency-domain spatial stream comprising a sign-inverted complex conjugate of the second data symbol mapped to a subcarrier of a second frequency symbol, the second frequency-domain spatial stream comprising a complex conjugate of the first data symbol mapped to the subcarrier of the second frequency symbol.

Example 42 includes the subject matter of any one of Examples 33-41, and optionally, wherein the first and second time-domain streams comprise Cyclic Prefix (CP) extensions.

Example 43 includes the subject matter of any one of Examples 33-42, and optionally, comprising transmitting a first spatial stream of the MIMO transmission via a first antenna and a second spatial stream of the MIMO transmission via a second antenna.

Example 44 includes the subject matter of any one of Examples 33-43, and optionally, wherein the MIMO transmission comprises a Single Carrier (SC) MIMO transmission.

Example 45 includes the subject matter of any one of Examples 33-44, and optionally, wherein the MIMO transmission comprises a $2 \times N_R$ MIMO transmission, wherein $N_R$ is an integer equal to or greater than 1.

Example 46 includes the subject matter of any one of Examples 33-45, and optionally, comprising transmitting the MIMO transmission over a Directional Multi-Gigabit (DMG) band.

Example 47 includes the subject matter of any one of Examples 33-46, and optionally, wherein the wireless station is a Directional Multi-Gigabit (DMG) Station (STA).

Example 48 includes a product comprising one or more tangible computer-readable non-transitory storage media comprising computer-executable instructions operable to, when executed by at least one computer processor, enable the at least one computer processor to implement operations at a wireless station, the operations comprising generating a plurality of time-domain streams in a time domain, the plurality of time-domain streams comprising at least a first time-domain stream comprising a first data sequence in a first interval and a second time-domain stream comprising a second data sequence in the first interval, the first time-domain stream comprises a time-inverted and sign-inverted complex conjugate of the second data sequence in a second interval subsequent to the first interval, and the second time-domain stream comprises a time-inverted complex conjugate of the first data sequence in the second interval; converting the plurality of time-domain streams into a respective plurality of frequency-domain streams in a frequency domain; and transmitting a Multiple-Input-Multiple-Output (MIMO) transmission based on the plurality of frequency-domain streams.

Example 49 includes the subject matter of Example 48, and optionally, wherein, in the first interval, the first time-domain stream comprises a Guard Interval (GI) sequence following the first data sequence, and a time-inverted complex conjugate of the GI sequence prior to the first data sequence, and wherein, in the second interval, the first time-domain stream comprises the GI sequence following the time-inverted and sign-inverted complex conjugate of the second data sequence, and a time-inverted and sign-inverted complex conjugate of the GI sequence prior to the time-inverted and sign-inverted complex conjugate of the second data sequence.

Example 50 includes the subject matter of Example 49, and optionally, wherein, in the first interval, the second time-domain stream comprises the GI sequence following the second data sequence, and the time-inverted and sign-inverted complex conjugate of the GI sequence prior to the second data sequence, and wherein, in the second interval, the second time-domain stream comprises the GI sequence following the time-inverted complex conjugate of the first data sequence, and the time-inverted complex conjugate of the GI sequence prior to the time-inverted complex conjugate of the first data sequence.

Example 51 includes the subject matter of Example 49 or 50, and optionally, wherein the GI sequence has a length of M samples, and each of the first and second data sequences has a length of (N−2M) samples, wherein N denotes a Discrete Fourier Transform (DFT) size of each of the first and second intervals.

Example 52 includes the subject matter of any one of Examples 49-51, and optionally, wherein the GI sequence has a length of 32 samples or 64 samples.

Example 53 includes the subject matter of any one of Examples 49-52, and optionally, wherein the GI sequence comprises a Golay sequence.

Example 54 includes the subject matter of any one of Examples 48-53, and optionally, wherein the operations comprise mapping the plurality of frequency domain streams to a plurality of frequency domain spatial streams according to a Space Time Block Code (STBC) scheme.

Example 55 includes the subject matter of Example 54, and optionally, wherein the STBC scheme comprises an Alamouti scheme.

Example 56 includes the subject matter of any one of Examples 48-55, and optionally, wherein the operations comprise mapping the plurality of frequency domain streams to at least a first frequency-domain spatial stream and a second frequency-domain spatial stream, the first frequency-domain spatial stream comprising a first data symbol of the first data sequence mapped to a subcarrier of a first frequency symbol, the second frequency-domain spatial stream comprising a second data symbol of the second data sequence mapped to the subcarrier of the first frequency symbol, the first frequency-domain spatial stream comprising a sign-inverted complex conjugate of the second data symbol mapped to a subcarrier of a second frequency symbol, the second frequency-domain spatial stream comprising a complex conjugate of the first data symbol mapped to the subcarrier of the second frequency symbol.

Example 57 includes the subject matter of any one of Examples 48-56, and optionally, wherein the first and second time-domain streams comprise Cyclic Prefix (CP) extensions.

Example 58 includes the subject matter of any one of Examples 48-57, and optionally, wherein the operations comprise transmitting a first spatial stream of the MIMO transmission via a first antenna and a second spatial stream of the MIMO transmission via a second antenna.

Example 59 includes the subject matter of any one of Examples 48-58, and optionally, wherein the MIMO transmission comprises a Single Carrier (SC) MIMO transmission.

Example 60 includes the subject matter of any one of Examples 48-59, and optionally, wherein the MIMO transmission comprises a $2 \times N_R$ MIMO transmission, wherein $N_R$ is an integer equal to or greater than 1.

Example 61 includes the subject matter of any one of Examples 48-60, and optionally, wherein the operations comprise transmitting the MIMO transmission over a Directional Multi-Gigabit (DMG) band.

Example 62 includes the subject matter of any one of Examples 48-61, and optionally, wherein the wireless station is a Directional Multi-Gigabit (DMG) Station (STA).

Example 63 includes an apparatus of wireless communication by a wireless station, the apparatus comprising means for generating a plurality of time-domain streams in a time domain, the plurality of time-domain streams comprising at least a first time-domain stream comprising a first data sequence in a first interval and a second time-domain stream comprising a second data sequence in the first interval, the first time-domain stream comprises a time-inverted and sign-inverted complex conjugate of the second data sequence in a second interval subsequent to the first interval, and the second time-domain stream comprises a time-inverted complex conjugate of the first data sequence in the second interval; means for converting the plurality of time-domain streams into a respective plurality of frequency-domain streams in a frequency domain; and means for transmitting a Multiple-Input-Multiple-Output (MIMO) transmission based on the plurality of frequency-domain streams.

Example 64 includes the subject matter of Example 63, and optionally, wherein, in the first interval, the first time-domain stream comprises a Guard Interval (GI) sequence following the first data sequence, and a time-inverted complex conjugate of the GI sequence prior to the first data sequence, and wherein, in the second interval, the first time-domain stream comprises the GI sequence following the time-inverted and sign-inverted complex conjugate of the second data sequence, and a time-inverted and sign-inverted complex conjugate of the GI sequence prior to the time-inverted and sign-inverted complex conjugate of the second data sequence.

Example 65 includes the subject matter of Example 64, and optionally, wherein, in the first interval, the second time-domain stream comprises the GI sequence following the second data sequence, and the time-inverted and sign-inverted complex conjugate of the GI sequence prior to the second data sequence, and wherein, in the second interval, the second time-domain stream comprises the GI sequence following the time-inverted complex conjugate of the first data sequence, and the time-inverted complex conjugate of the GI sequence prior to the time-inverted complex conjugate of the first data sequence.

Example 66 includes the subject matter of Example 64 or 65, and optionally, wherein the GI sequence has a length of M samples, and each of the first and second data sequences has a length of (N−2M) samples, wherein N denotes a Discrete Fourier Transform (DFT) size of each of the first and second intervals.

Example 67 includes the subject matter of any one of Examples 64-66, and optionally, wherein the GI sequence has a length of 32 samples or 64 samples.

Example 68 includes the subject matter of any one of Examples 64-67, and optionally, wherein the GI sequence comprises a Golay sequence.

Example 69 includes the subject matter of any one of Examples 63-68, and optionally, comprising means for mapping the plurality of frequency domain streams to a plurality of frequency domain spatial streams according to a Space Time Block Code (STBC) scheme.

Example 70 includes the subject matter of Example 69, and optionally, wherein the STBC scheme comprises an Alamouti scheme.

Example 71 includes the subject matter of any one of Examples 63-70, and optionally, comprising means for mapping the plurality of frequency domain streams to at least a first frequency-domain spatial stream and a second frequency-domain spatial stream, the first frequency-domain spatial stream comprising a first data symbol of the first data sequence mapped to a subcarrier of a first frequency symbol, the second frequency-domain spatial stream comprising a second data symbol of the second data sequence mapped to the subcarrier of the first frequency symbol, the first frequency-domain spatial stream comprising a sign-inverted complex conjugate of the second data symbol mapped to a subcarrier of a second frequency symbol, the second frequency-domain spatial stream comprising a complex conjugate of the first data symbol mapped to the subcarrier of the second frequency symbol.

Example 72 includes the subject matter of any one of Examples 63-71, and optionally, wherein the first and second time-domain streams comprise Cyclic Prefix (CP) extensions.

Example 73 includes the subject matter of any one of Examples 63-72, and optionally, comprising means for transmitting a first spatial stream of the MIMO transmission via a first antenna and a second spatial stream of the MIMO transmission via a second antenna.

Example 74 includes the subject matter of any one of Examples 63-73, and optionally, wherein the MIMO transmission comprises a Single Carrier (SC) MIMO transmission.

Example 75 includes the subject matter of any one of Examples 63-74, and optionally, wherein the MIMO transmission comprises a 2×$N_R$ MIMO transmission, wherein $N_R$ is an integer equal to or greater than 1.

Example 76 includes the subject matter of any one of Examples 63-75, and optionally, comprising means for transmitting the MIMO transmission over a Directional Multi-Gigabit (DMG) band.

Example 77 includes the subject matter of any one of Examples 63-76, and optionally, wherein the wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
memory circuitry; and
a processor comprising logic and circuitry configured to cause a wireless communication station (STA) to:
generate first and second space-time streams according to a Single Carrier (SC) Physical layer (PHY) structure, the first and second space-time streams comprising a plurality of data sequences according to a space-time coding scheme, the space-time coding-scheme comprising a repetition, with coding, of the plurality of data sequences over the first and second space-time streams, wherein a first data sequence of the plurality of data sequences is repeated, with coding, in a first pair of data sequences to be included in the first and second space-time streams, and a second data sequence of the plurality of data sequences is repeated, with coding, in a second pair of data sequences to be included in the first and second space-time streams, wherein the SC PHY structure comprises a first Guard Interval (GI) between consecutive data sequences in the first space time stream, and a second GI between consecutive data sequences in the second space time stream, the first GI comprises a first Golay sequence, the second GI comprising a second Golay sequence different from the first Golay sequence; and
transmit a SC transmission based on the first and second space-time streams in a frequency band above 45 Gigahertz (GHz).

2. The apparatus of claim 1, wherein the first pair of data sequences comprises the first data sequence and a complex conjugate of the first data sequence with inverted order, and wherein the second pair of data sequences comprises the second data sequence and a sign-inverted complex conjugate of the second data sequence with inverted order.

3. The apparatus of claim 1, wherein the first GI and the second GI have a same GI length.

4. The apparatus of claim 3, wherein the SC PHY structure comprises a data sequence length, which is based on the GI length.

5. The apparatus of claim 1, wherein each of the first GI and the second GI has a GI length of 32.

6. The apparatus of claim 1, wherein each of the first GI and the second GI has a GI length of 64.

7. The apparatus of claim 1, wherein the space-time coding scheme comprises a Space Time Block Code (STBC) scheme.

8. The apparatus of claim 1, wherein the STA comprises a Directional Multi-Gigabit (DMG) STA.

9. The apparatus of claim 1, wherein the STA comprises an Extended Directional Multi-Gigabit (EDMG) STA.

10. The apparatus of claim 1 comprising a radio, the processor configured to cause the radio to transmit the SC transmission.

11. The apparatus of claim 10 comprising one or more antennas connected to the radio, and a processor to execute instructions of an Operating System (OS).

12. A product comprising one or more tangible computer-readable non-transitory storage media comprising computer-executable instructions operable to, when executed by at least one processor, enable the at least one processor to cause a wireless communication station (STA) to:

generate first and second space-time streams according to a Single Carrier (SC) Physical layer (PHY) structure, the first and second space-time streams comprising a plurality of data sequences according to a space-time coding scheme, the space-time coding-scheme comprising a repetition, with coding, of the plurality of data sequences over the first and second space-time streams, wherein a first data sequence of the plurality of data sequences is repeated, with coding, in a first pair of data sequences to be included in the first and second space-time streams, and a second data sequence of the plurality of data sequences is repeated, with coding, in a second pair of data sequences to be included in the first and second space-time streams, wherein the SC PHY structure comprises a first Guard Interval (GI) between consecutive data sequences in the first space time stream, and a second GI between consecutive data sequences in the second space time stream, the first GI comprises a first Golay sequence, the second GI comprising a second Golay sequence different from the first Golay sequence; and transmit a SC transmission based on the first and second space-time streams in a frequency band above 45 Gigahertz (GHz).

13. The product of claim 12, wherein the first pair of data sequences comprises the first data sequence and a complex conjugate of the first data sequence with inverted order, and wherein the second pair of data sequences comprises the second data sequence and a sign-inverted complex conjugate of the second data sequence with inverted order.

14. The product of claim 12, wherein the first GI and the second GI have a same GI length.

15. The product of claim 14, wherein the SC PHY structure comprises a data sequence length, which is based on the GI length.

16. The product of claim 12, wherein each of the first GI and the second GI has a GI length of 32.

17. The product of claim 12, wherein each of the first GI and the second GI has a GI length of 64.

18. The product of claim 12, wherein the space-time coding scheme comprises a Space Time Block Code (STBC) scheme.

19. The product of claim 12, wherein the STA comprises a Directional Multi-Gigabit (DMG) STA.

20. The product of claim 12, wherein the STA comprises an Extended Directional Multi-Gigabit (EDMG) STA.

21. An apparatus comprising:

means for causing a wireless communication station (STA) to generate first and second space-time streams according to a Single Carrier (SC) Physical layer (PHY) structure, the first and second space-time streams comprising a plurality of data sequences according to a space-time coding scheme, the space-time coding-scheme comprising a repetition, with coding, of the plurality of data sequences over the first and second space-time streams, wherein a first data sequence of the plurality of data sequences is repeated, with coding, in a first pair of data sequences to be included in the first and second space-time streams, and a second data sequence of the plurality of data sequences is repeated, with coding, in a second pair of data sequences to be included in the first and second space-time streams, wherein the SC PHY structure comprises a first Guard Interval (GI) between consecutive data sequences in the first space time stream, and a second GI between consecutive data sequences in the second space time stream, the first GI comprises a first Golay sequence, the second GI comprising a second Golay sequence different from the first Golay sequence; and means for causing the STA to transmit a SC transmission based on the first and second space-time streams in a frequency band above 45 Gigahertz (GHz).

22. The apparatus of claim 21, wherein the first pair of data sequences comprises the first data sequence and a complex conjugate of the first data sequence with inverted order, and wherein the second pair of data sequences comprises the second data sequence and a sign-inverted complex conjugate of the second data sequence with inverted order.

* * * * *